(12) United States Patent
Bhambhlani

(10) Patent No.: US 11,757,725 B1
(45) Date of Patent: Sep. 12, 2023

(54) NETWORK ANALYSIS TECHNIQUES FOR GROUPING CONNECTED OBJECTS AND EXECUTING REMEDIAL MEASURES

(71) Applicant: SAS Institute Inc., Cary, NC (US)

(72) Inventor: Himanshu Chandrakant Bhambhlani, Maharashtra (IN)

(73) Assignee: SAS Institute, Inc., Cary, NC (US)

( * ) Notice: Subject to any disclaimer, the term of this patent is extended or adjusted under 35 U.S.C. 154(b) by 0 days.

(21) Appl. No.: 18/169,342

(22) Filed: Feb. 15, 2023

Related U.S. Application Data

(60) Provisional application No. 63/401,539, filed on Aug. 26, 2022.

(30) Foreign Application Priority Data

May 19, 2022 (IN) .............................. 202211028924

(51) Int. Cl.
| | |
|---|---|
| *H04L 41/12* | (2022.01) |
| *H04L 41/0604* | (2022.01) |
| *H04L 41/22* | (2022.01) |
| *H04L 9/40* | (2022.01) |
| *H04L 41/0631* | (2022.01) |
| *H04L 41/0677* | (2022.01) |

(52) U.S. Cl.
CPC ............ *H04L 41/12* (2013.01); *H04L 41/065* (2013.01); *H04L 41/0627* (2013.01); *H04L 41/0677* (2013.01); *H04L 41/22* (2013.01); *H04L 63/1433* (2013.01)

(58) Field of Classification Search
CPC ..... H04L 41/065; H04L 41/0659–0661; H04L 41/0677; H04L 41/0823; H04L 41/0836; H04L 41/12–122; H04L 41/34; H04L 41/342; H04L 41/344; H04L 41/40; H04L 63/1433; H04L 67/1089
See application file for complete search history.

(56) References Cited

U.S. PATENT DOCUMENTS

| | | | |
|---|---|---|---|
| 11,405,426 B2* | 8/2022 | Nguyen | H04L 63/1433 |
| 2005/0076104 A1* | 4/2005 | Liskov | H04L 67/01 709/217 |
| 2014/0280363 A1* | 9/2014 | Heng | G06F 16/185 707/802 |
| 2015/0009807 A1* | 1/2015 | Bejerano | H04L 41/12 370/255 |
| 2020/0236129 A1* | 7/2020 | Barkovic | H04L 43/045 |

* cited by examiner

*Primary Examiner* — Brendan Y Higa

(74) *Attorney, Agent, or Firm* — Kilpatrick Townsend & Stockton LLP

(57) ABSTRACT

Groups of connected nodes in a network of nodes can be detected for evaluating and mitigating risks of the network of nodes. For example, a system can process one or more subnetworks of the network of nodes in parallel. For each subnetwork, the system can identify root nodes and their reachable nodes to create rooted groups of connected nodes. The system then can determine outdegrees of the remaining nodes in the network. The system can identify reachable nodes from a remaining node of the highest outdegree to create a nonrooted group of connected nodes. The system can estimate a risk value based on the number of rooted groups and nonrooted groups, the number of nodes in each rooted group and nonrooted group, and the attributes of the nodes in each group. The system can mitigate potential risks by reconfiguring the network of nodes.

30 Claims, 22 Drawing Sheets

1600

DETERMINE A FIRST SET OF RISK VALUES FOR A FIRST NUMBER OF ROOTED GROUPS OF CONNECTED NODES, A RISK VALUE FOR EACH ROOTED GROUP BEING DETERMINED BASED ON A PARTICULAR NUMBER OF NODES IN EACH ROOTED GROUP AND ATTRIBUTES OF THE PARTICULAR NUMBER OF NODES IN EACH ROOTED GROUP
1602

DETERMINE A SECOND SET OF RISK VALUES FOR A SECOND NUMBER OF NONROOTED GROUP OF CONNECTED NODES, A RISK VALUE FOR EACH NONROOTED GROUP BEING DETERMINED BASED ON A PARTICULAR NUMBER OF NODES IN EACH NONROOTED GROUP AND ATTRIBUTES OF THE PARTICULAR NUMBER OF NODES IN EACH NONROOTED GROUP
1604

DETERMINE A RISK VALUE FOR THE NETWORK OF NODES BASED ON THE FIRST SET OF RISK VALUES FOR THE FIRST NUMBER OF ROOTED GROUPS AND THE SECOND SET OF RISK VALUES FOR THE SECOND NUMBER OF NONROOTED GROUPS
1606

COMPARE THE RISK VALUE TO A PREDETERMINED THRESHOLD
1608

AUTOMATICALLY GENERATE A WARNING SIGNAL IN RESPONSE TO DETERMINING THAT THE RISK VALUE MEETS OR EXCEEDS THE PREDETERMINED THRESHOLD
1610

EXECUTE ONE OR MORE REMEDIAL MEASURES CONFIGURED TO REDUCE THE RISK VALUE FOR THE NETWORK OF NODES
1612

FIG. 16

| SR. NO. | PARENT_ID | CHILD_ID | DEPENDENCY_TYPE |
|---|---|---|---|
| 1 | NODE_A | NODE_B | ONE-WAY |
| 2 | NODE_A | NODE_C | ONE-WAY |
| 3 | NODE_C | NODE_D | MUTUAL |
| 4 | NODE_D | NODE_C | MUTUAL |
| 5 | NODE_C | NODE_E | ONE-WAY |
| 6 | NODE_F | NODE_E | ONE-WAY |

FIG. 17

NETWORK ANALYSIS TECHNIQUES FOR GROUPING CONNECTED OBJECTS AND EXECUTING REMEDIAL MEASURES

REFERENCE TO RELATED APPLICATION

This claims the benefit of priority under 35 U.S.C. § 119(a) to Indian Patent Application No. 202211028924, filed May 19, 2022; and the benefit of priority under 35 U.S.C. § 119(e) to U.S. Provisional Patent Application No. 63/401, 539, filed Aug. 26, 2022, the entirety of each of which is hereby incorporated by reference herein.

TECHNICAL FIELD

The present disclosure relates generally to network analysis. More specifically, but not by way of limitation, this disclosure relates to network analysis techniques for grouping connected objects and executing remedial measures.

BACKGROUND

Interconnected objects can be found in different industrial applications, such as software services, computer networks, manufacturing, supply chain, disease control, etc. A system of interconnected objects can include tens of thousands or even hundreds of thousands of objects connected to each other, for example over communication networks. The interconnected objects can be software components, computing devices, sensors, machines, and other objects that can communicate with one another. The interconnected objects may function interdependently. As a result, if one object fails or is vulnerable to attacks, other connected objects may also be affected.

SUMMARY

One example of the present disclosure includes a system having one or more processors and one or more memory devices including instructions that are executable by the one or more processors for causing the one or more processors to perform operations. The operations can include receiving an input representing a network of nodes, the network of nodes being a directed network of nodes and including two or more nodes and at least one link between the two or more nodes. The operations can include identifying one or more subnetworks in the network of nodes, the one or more subnetworks being not connected to each other. The operations can include identifying a root node in the one or more subnetworks, the root node being a node that has no incoming links in the one or more subnetworks. The operations can include identifying a first set of reachable nodes from the root node. The operations can include creating a rooted group of connected nodes, the rooted group of connected nodes including the root node and the first set of reachable nodes from the root node. The operations can include determining remaining nodes that are present in the one or more subnetworks and outside of the rooted group of connected nodes. The operations can include determining outdegrees of the remaining nodes in parallel, each of the outdegrees being a number of outgoing links from a corresponding one of the remaining nodes. The operations can include identifying a particular remaining node that is associated with a highest outdegree among the outdegrees of the remaining nodes, the particular remaining node being a non-root node. The operations can include identifying a second set of reachable nodes from the particular remaining node. The operations can include creating a nonrooted group of connected nodes, the nonrooted group of connected nodes including the particular remaining node and the second set of reachable nodes from that particular remaining node. The operations can include generating an output that indicates the rooted group of connected nodes and the nonrooted group of connected nodes.

Another example of the present disclosure can include a method. The method can include receiving an input representing a network of nodes, the network of nodes being a directed network of nodes and including two or more nodes and at least one link between the two or more nodes. The method can include identifying one or more subnetworks in the network of nodes, the one or more subnetworks being not connected to each other. The method can include identifying a root node in the one or more subnetworks, the root node being a node that has no incoming links in the one or more subnetworks. The method can include identifying a first set of reachable nodes from the root node. The method can include creating a rooted group of connected nodes, the rooted group of connected nodes including the root node and the first set of reachable nodes from the root node. The method can include determining remaining nodes that are present in the one or more subnetworks and outside of the rooted group of connected nodes. The method can include determining outdegrees of the remaining nodes in parallel, each of the outdegrees being a number of outgoing links from a corresponding one of the remaining nodes. The method can include identifying a particular remaining node that is associated with a highest outdegree among the outdegrees of the remaining nodes, the particular remaining node being a non-root node. The method can include identifying a second set of reachable nodes from the particular remaining node. The method can include creating a nonrooted group of connected nodes, the nonrooted group of connected nodes including the particular remaining node and the second set of reachable nodes from that particular remaining node. The method can include generating an output that indicates the rooted group of connected nodes and the nonrooted group of connected nodes. Some or all of the method steps may be implemented by one or more processors.

Yet another example of the present disclosure can include a non-transitory computer-readable medium comprising program code that is executable by one or more processors for causing the processor to perform operations. The operations can include receiving an input representing a network of nodes, the network of nodes being a directed network of nodes and including two or more nodes and at least one link between the two or more nodes. The operations can include identifying one or more subnetworks in the network of nodes, the one or more subnetworks being not connected to each other. The operations can include identifying a root node in the one or more subnetworks, the root node being a node that has no incoming links in the one or more subnetworks. The operations can include identifying a first set of reachable nodes from the root node. The operations can include creating a rooted group of connected nodes, the rooted group of connected nodes including the root node and the first set of reachable nodes from the root node. The operations can include determining remaining nodes that are present in the one or more subnetworks and outside of the rooted group of connected nodes. The operations can include determining outdegrees of the remaining nodes in parallel, each of the outdegrees being a number of outgoing links from a corresponding one of the remaining nodes. The operations can include identifying a particular remaining node that is associated with a highest outdegree among the outdegrees of the remaining nodes, the particular remaining node being a non-root node. The operations can include identifying a second set of reachable nodes from the particular remaining node. The operations can include creating a nonrooted group of connected nodes, the nonrooted group of connected nodes including the particular remaining node and the second set of reachable nodes from that particular remaining node. The operations can include generating an output that indicates the rooted group of connected nodes and the nonrooted group of connected nodes.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 16 is a flow chart of an example of a process for determining a risk value for a network of nodes and executing one or more remedial measures to reduce risks for the network of nodes according to some aspects.

FIG. 17 depicts a node-link diagram and a table representing an example of a network of nodes according to some aspects.

Figure 1:
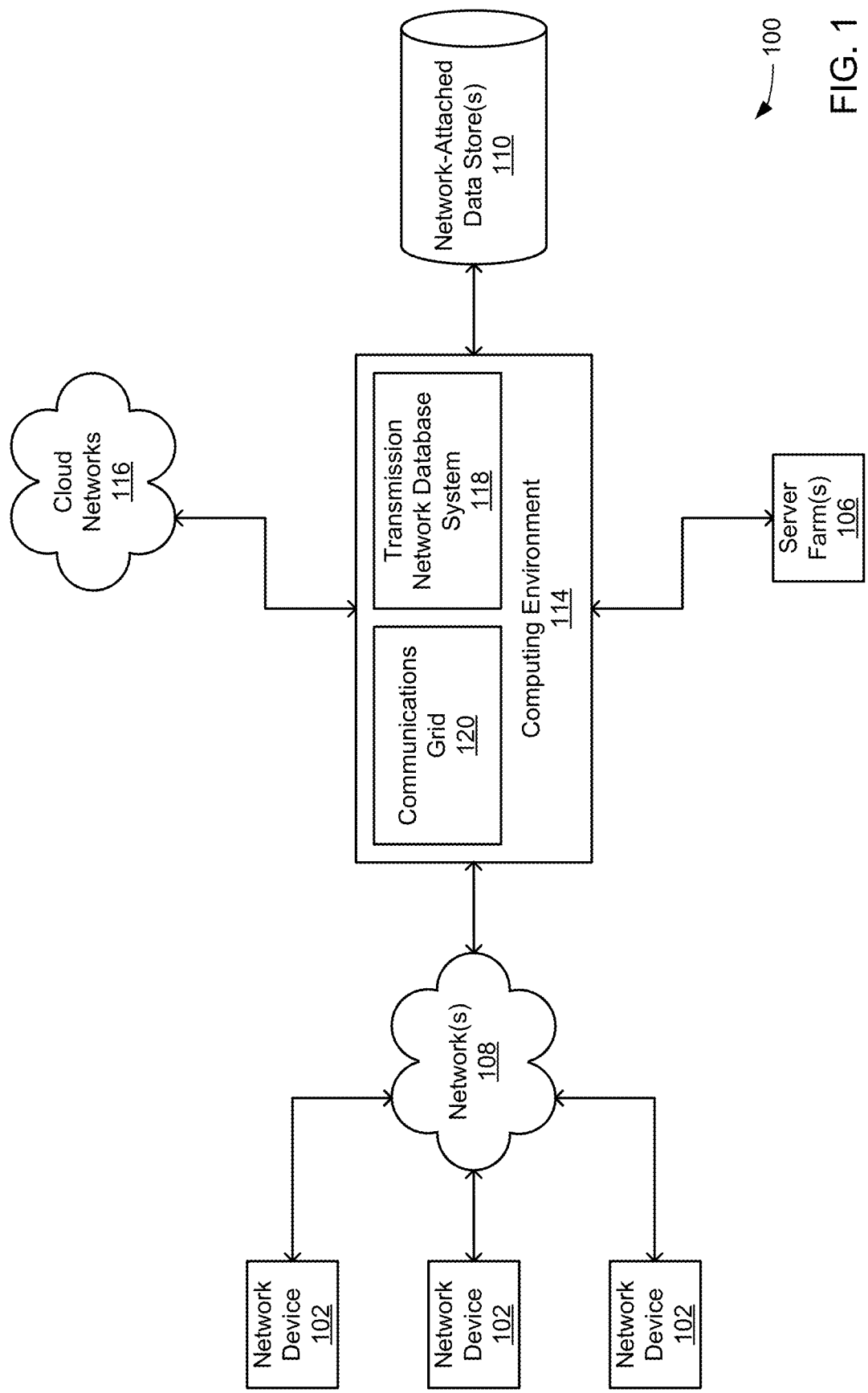
FIG. 1 is a block diagram that provides an illustration of the hardware components of a data transmission network, according to embodiments of the present technology.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Interconnected objects, such as interconnected devices or entities, can experience various operational events for a variety of reasons. For example, the objects can be an interconnected network of computer devices and the operational events can be anomalies or cyber-attacks. As another example, the objects can be distributed energy resources and distribution transformers, and the operational events can be transformer anomalies or irregular fluctuations of energy sources. The operational events can negatively impact the performance of the interconnected objects and lead to breakdowns, failures, or otherwise suboptimal performance of the interconnected objects. Risk exposed to one object can have a cascading effect that negatively impacts the performance of other objects connected to the particular object and even the entire system containing the object and other interconnected objects. Due to their interconnectedness, certain groups are formed, and each group can be considered as a singular risk for the system. Each group may be exposed to certain risks. The risk level of the entire system can be evaluated based on the number of groups of objects and the risk to each group. Thus, it is desirable to identify groups of the interconnected objects to determine the risk level of the entire system so as to prevent or better mitigate risks or technical failures.

Certain aspects and features of the present disclosure can overcome one or more of the abovementioned problems by providing a detection system for automatically and accurately detecting groups of connected objects using a two-part process. In a first part of the process, the detection system can automatically identify rooted groups of connected nodes and nonrooted groups of connected nodes. A rooted group of connected nodes can include a root node and one or more child nodes that are children of the root node. A root node can be a parent node that has only outgoing links and no incoming links. A child node has one or more incoming links from other nodes. A nonrooted group of connected nodes does not have a root node; thus, all of the nodes in the group have at least one incoming link. Each group may pose a singular risk to the network. After identifying the rooted and nonrooted groups of connected nodes, the detection system can initiate a second part of the process. In the second part of the process, the detection system can determine a risk value based on the detected groups. If the risk value meets or exceeds a predetermined threshold, the detection system can automatically generate a warning signal and execute remedial measures, such as to reconfigure the interconnections in the network to reduce the number of rooted groups, the number of nonrooted groups, or both. In this way, the detection system can automatically identify the groups, determine the associated risks, and operate to mitigate the risks.

More specifically, the detection system can determine the rooted groups and nonrooted groups of connected nodes based on input data (e.g., a node-link diagram or a table) defining a network of nodes to represent the system of interconnected objects. The network of nodes can be a directed network with two or more nodes and at least one link between the two or more nodes to represent the objects and their interconnection. The detection system can identify all the subnetworks that are not connected with each other in the network. The detection system can then use parallel processing to identify all root nodes (e.g., parent nodes without incoming links) in the one or more subnetworks. Each root node can reach one or more child nodes following the directions of the links in the network. Each root node and all its reachable child nodes together can form a rooted group of connected nodes.

In addition to identifying all of the rooted groups of connected nodes in the network, the detection system can identify the nonrooted groups of connected nodes in the one or more subnetworks in parallel. For example, the detection system can determine the number of outgoing links from each remaining node in the one or more subnetworks. An "outgoing link" of a remaining node can be a directed link from the remaining node to another node. The number of outgoing links from a remaining node can be called an "outdegree" of the remaining node. After determining the number of outgoing links from each remaining node, the detection system can identify the remaining node that has the highest outdegree in each subnetwork. The detection system can determine the reachable nodes from the remaining node with the highest outdegree. A reachable node from a particular node can be any node to which there is a series of links from the particular node. The node with the highest outdegree can serve as a representative parent node, and all its reachable nodes can form a nonrooted group of connected nodes. In a descending order of outdegrees, the detection system can identify all the reachable nodes from each remaining node and form a nonrooted group of connected nodes. Using these techniques, the detection system can determine all the rooted groups and nonrooted groups are in the network.

In some examples, a nonrooted group A is a subgroup of nonrooted group B. When counting the number of the nonrooted groups, nonrooted group A can be identified and removed from counting as a nonrooted group, to avoid counting the same nonrooted group twice because of this overlap. For example, when the representative parent node of nonrooted group A is also part of nonrooted group B, nonrooted group A can be identified as a subgroup of nonrooted group B, because if one node in nonrooted group B can reach the representative parent node of nonrooted group A, that node can reach every node in nonrooted group A.

In some examples, a risk for a rooted group or a nonrooted group can be determined based on the number of nodes included in the group and the attributes of the connected nodes within the group. The attributes of a node can include dependency type from other nodes and stability of the node itself. The attributes can also include a condition of the node. The risk level of the network of nodes as a whole can be evaluated based on the number of groups of connected nodes, including rooted groups and nonrooted groups, and a risk level of each group.

The techniques described herein can be applied in numerous contexts to a wide variety of interconnected objects. As one particular example, the techniques described herein can be applied in the context of an electrical grid. An average distribution grid has tens of thousands of distribution transformers. In some examples, the distribution grid also includes various distributed energy resources, such as winder turbines, solar panels, and biofuel generators, one or more power storage devices, which can store energy or provide energy, and one or more distribution load devices, such as single-phase or three-phase motors. Distribution transformers and the various distributed energy resources can experience failures or other anomalies each year leading to interruptions in power supply. These interruptions can lead to substantial operational problems for the utility, monetary losses for utility users, and increased exposure to safety hazards.

In some examples, the abovementioned problems may be overcome by employing the techniques described herein. Distributed energy resources can be identified as root nodes since there is usually no electricity flowing into the distributed energy resources and only electricity going out. Distribution transformers that receive electricity from each distributed energy resource can be identified as children of the distributed energy resources. The collection of distributed energy resources and the distribution transformers can form rooted groups in a distribution grid. Besides the distributed energy resources and the distribution transformers included in the rooted groups, there can be distribution transformers remaining in the distribution network that do not receive electricity from distributed energy resources but only from main power grid. Alternatively, or additionally, there can also be distribution transformers remaining in the distribution network that can receive electricity from at least one distributed energy resource and the main power grid. Outdegrees of these remaining distribution transformers can be determined. An outdegree of a distribution transformer can be the number of transformers that directly receive electricity from the particular distribution transformer. Reachable transformers from a remaining distribution transformer with the highest outdegree can be identified to form a nonrooted group. When a first transformer is reachable from a second transformer or the first transformer can be reached by the second transformer, electricity currents can flow from the second transformer to the first transformer (directly or via other distribution transformers). Then a next remaining transformer with the next highest outdegree can be identified and all the reachable transformers from the next transformer can be identified to form another nonrooted group. Thus, all the rooted groups and nonrooted groups are identified in the entire distribution grid.

In some examples, a risk level for each group can be evaluated based on the conditions of the distribution transformers and the distributed energy resources in each group. The risk exposed to the entire distribution grid can then be evaluated based on a risk value of each group and the number of groups in the entire distribution network. The risk value of each group can be determined by the number of connected devices and the attributes of each interconnected device. For example, the attributes of a distribution transformer can include the health condition of the distribution transformer and environment surrounding the distribution transformer (e.g., temperature, precipitation, foliage). As another example, attributes of a wind turbine can include maintenance conditions and the environment surrounding the wind turbine (e.g., wind force, collisions by birds, insects, drones, or other objects). Yet as another examples, attributes of a solar panel can include maintenance conditions (e.g., routine cleaning) and environmental factors affecting the solar panel (e.g., cloud, temperature, shading). The risk of the power interruptions for the entire distribution grid can be mitigated by reconfiguring the connections in the distribution grid.

Besides the distribution power grid, the techniques in the present disclosure can also be used in other contexts. For example, the techniques described herein can be used in the context of a transmission power grid including transmission transformers and power generators. As another example, the techniques described herein can be used for detecting groups of interconnected computers in a network and mitigating cybersecurity risks for the entire network. As another example, the techniques described herein can be used for detecting groups of interconnected machines in a manufacturing facility and mitigating failure risks of the entire facility. As other examples, the techniques in the present disclosure can also be used in the contexts of software microservices, market analysis, and regulatory analysis in the banking industry.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-13 depict examples of systems and methods usable in connection with detecting groups of connected objects in a system, determining a risk value based on the groups of connected objects, and mitigating the risk to the system according to some aspects. Referring now to FIG. 1, shown is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
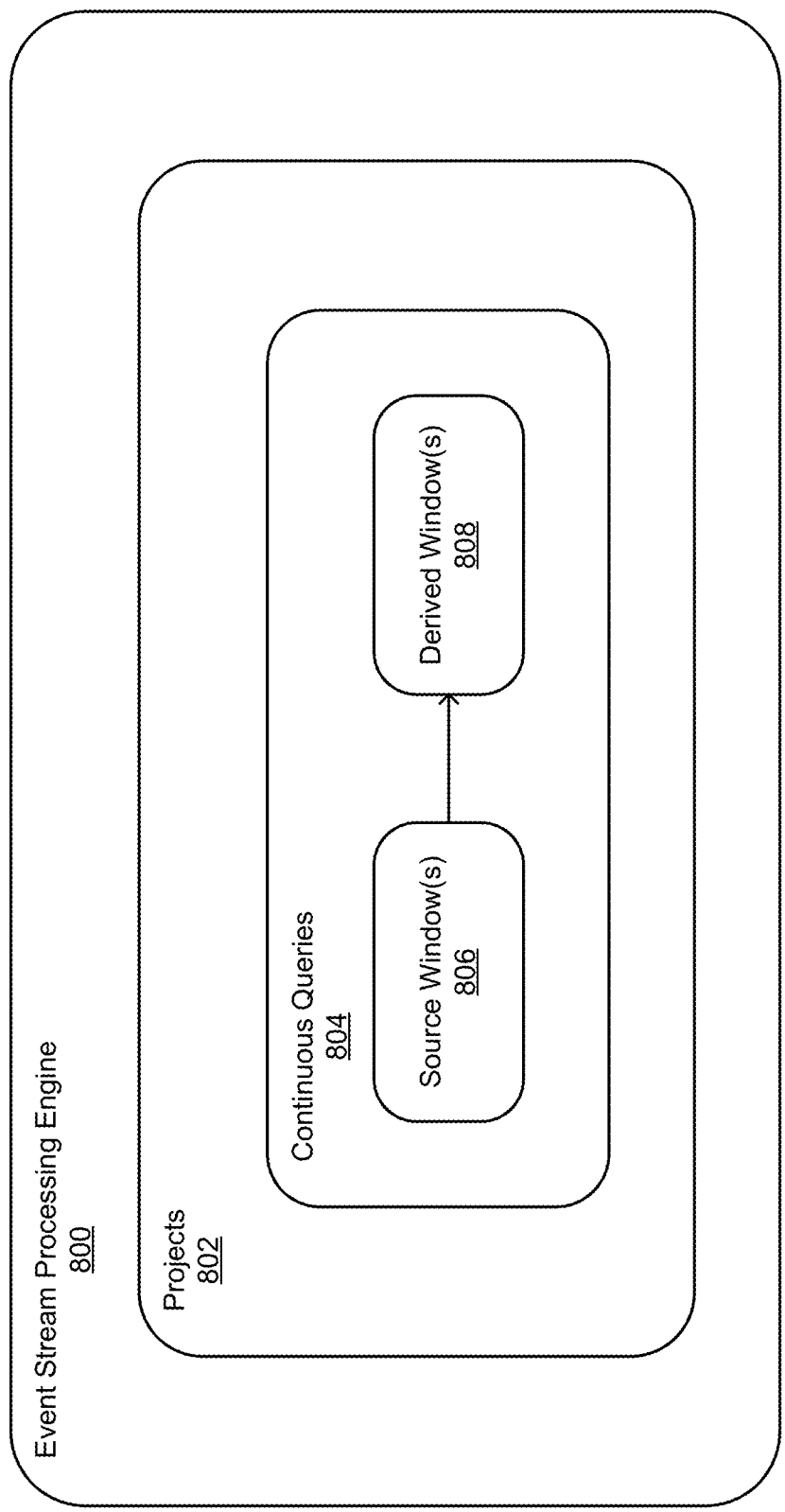
FIG. 8 illustrates a block diagram including components of an Event Stream Processing Engine (ESPE), according to embodiments of the present technology.
Figure 9:
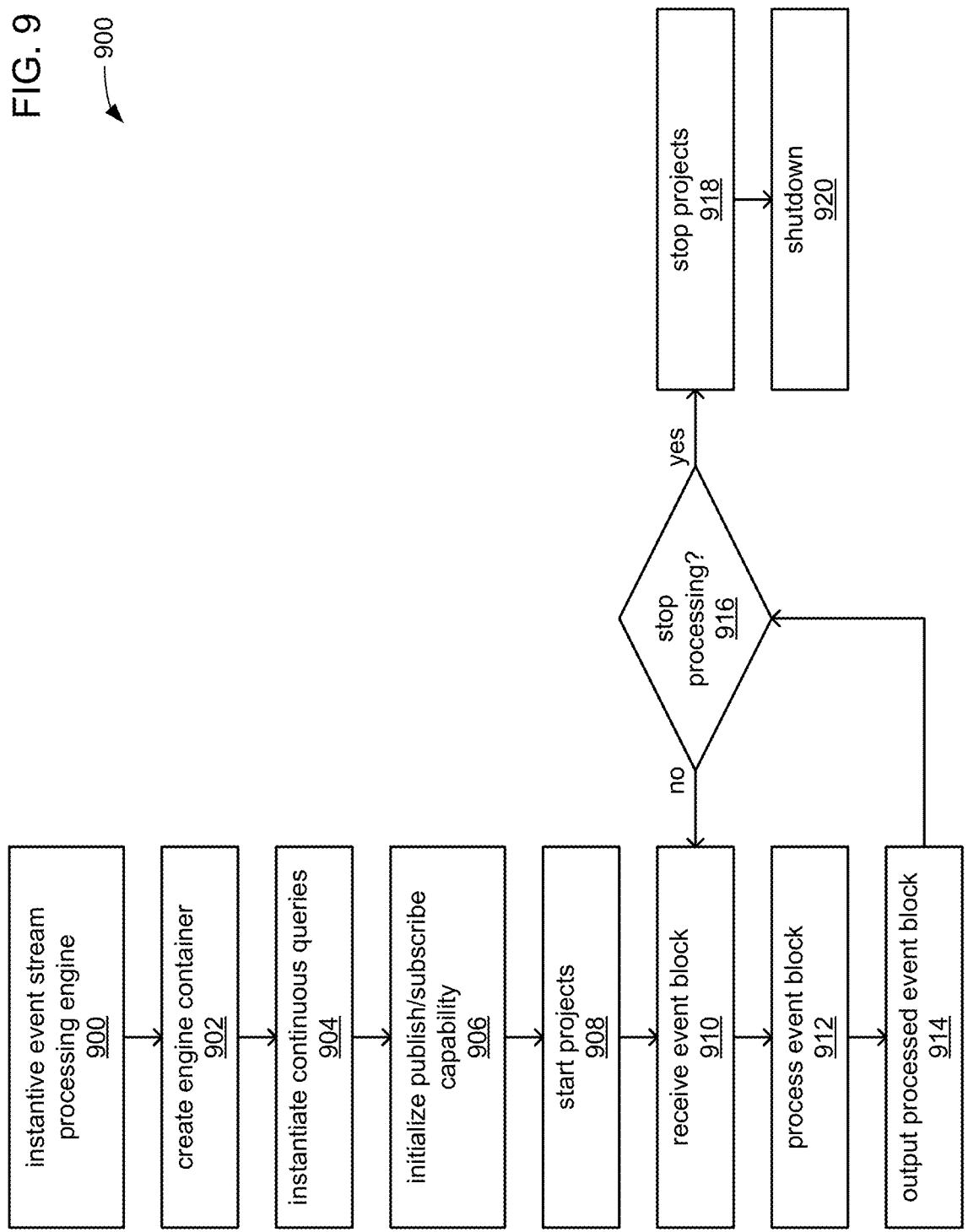
FIG. 9 illustrates a flow chart showing an example process including operations performed by an event stream processing engine, according to some embodiments of the present technology.
Figure 10:
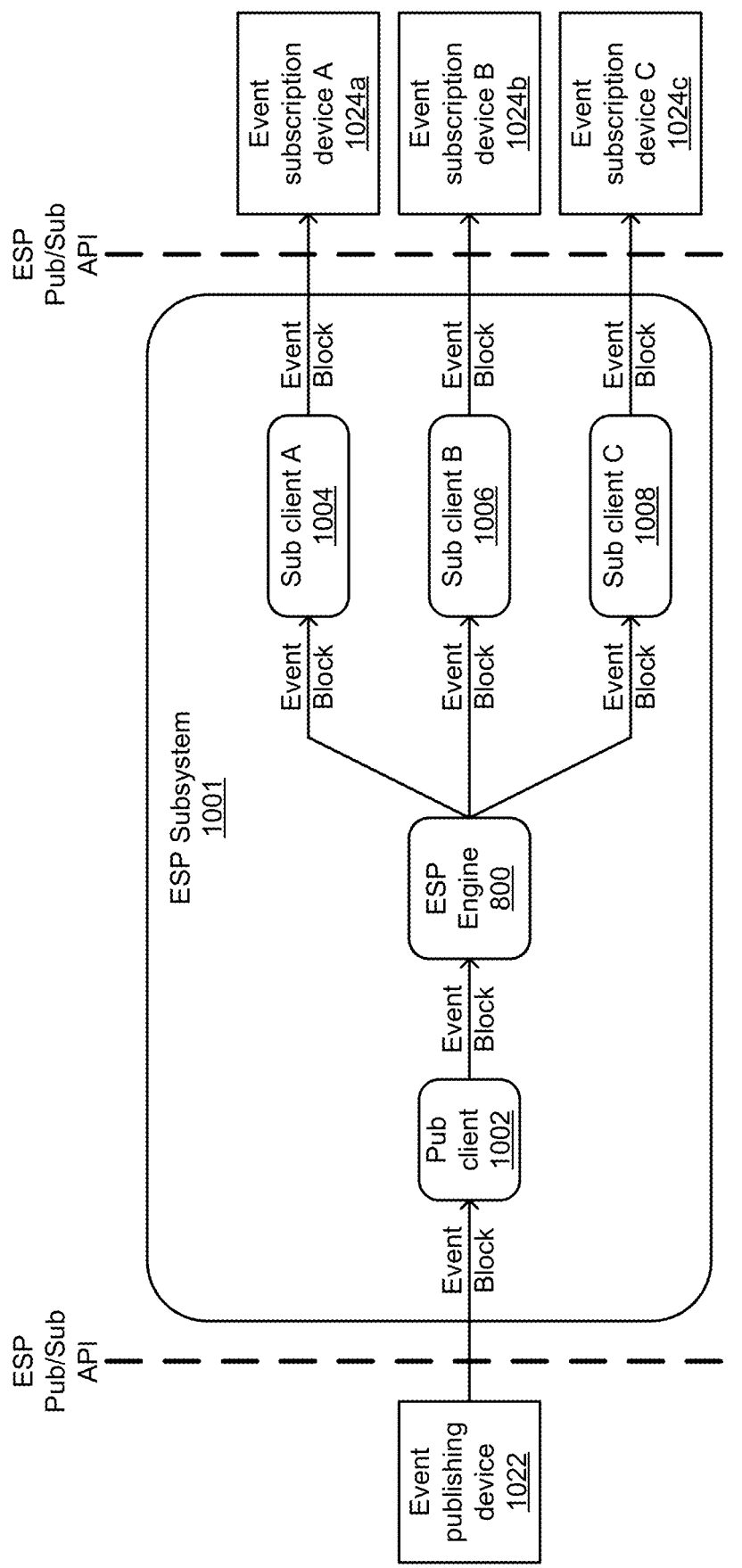
FIG. 10 illustrates an ESP system interfacing between a publishing device and event subscribing devices, according to embodiments of the present technology.

In other embodiments, network devices 102 may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices themselves. Network devices 102 may also include sensors that monitor their environment or other devices to collect data regarding that environment or those devices, and such network devices may provide data they collect over time. Network devices 102 may also include devices within the internet of things, such as devices within a home automation network. Some of these devices may be referred to as edge devices, and may involve edge computing circuitry. Data may be transmitted by network devices 102 directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, and network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices 102, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (I), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
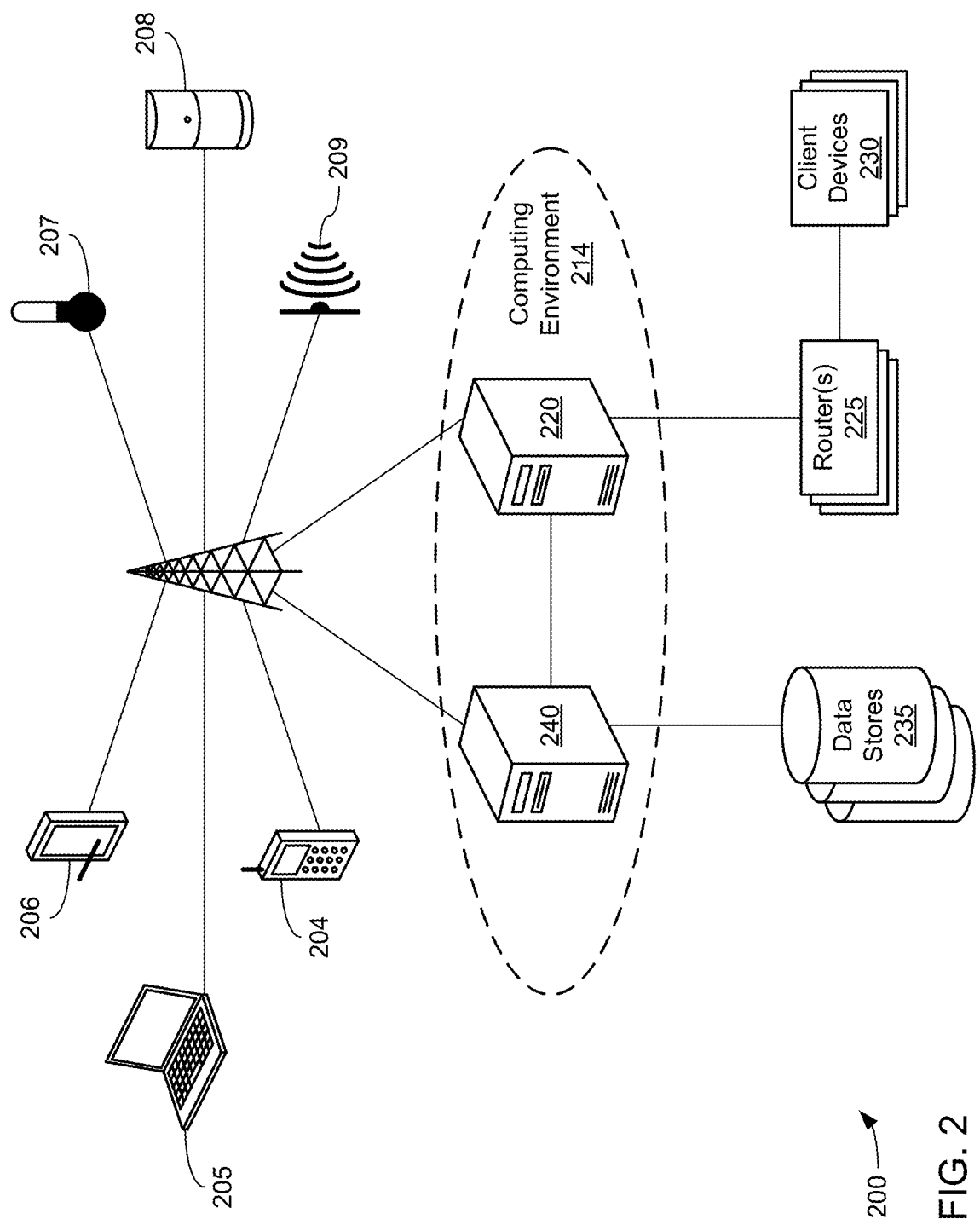
FIG. 2 illustrates an example network including an example set of devices communicating with each other over an exchange system and via a network, according to embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station). The communication can be routed to another network device, such as network devices 205-209, via base station. The communication can also be routed to computing environment 214 via base station. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting characteristics of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc., and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data they collect before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240 that is a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments.

Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
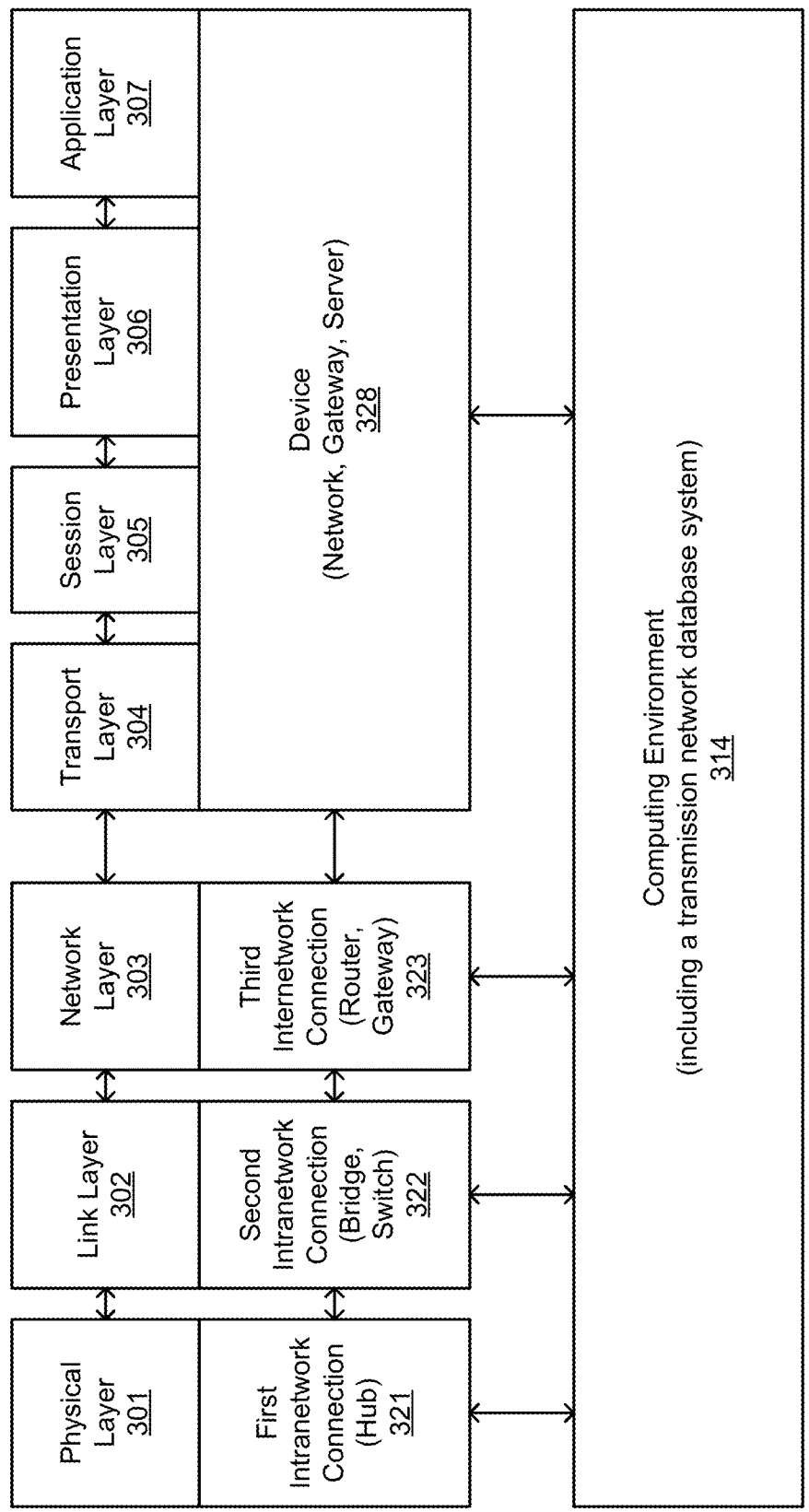
FIG. 3 illustrates a representation of a conceptual model of a communications protocol system, according to embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
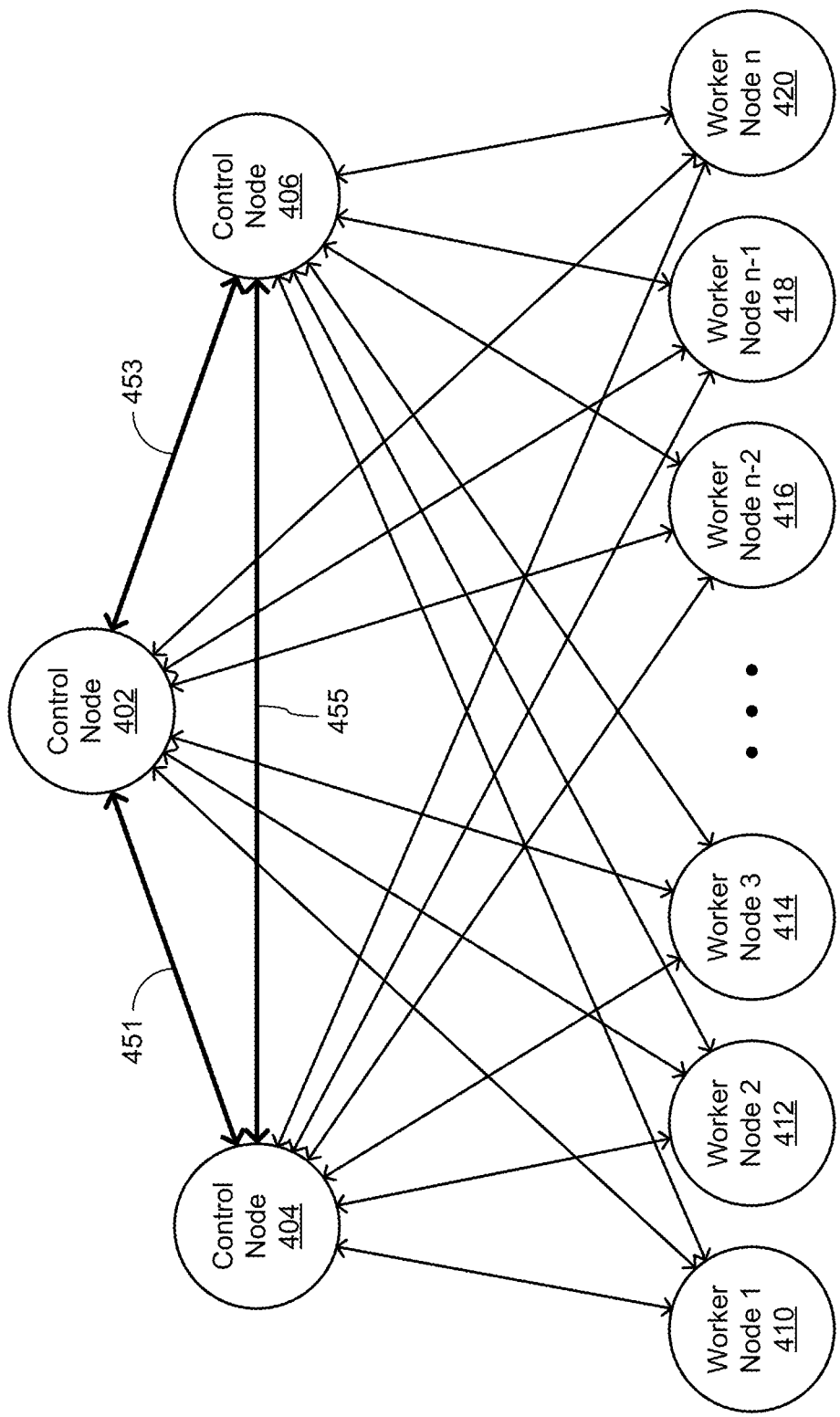
FIG. 4 illustrates a communications grid computing system including a variety of control and worker nodes, according to embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local to (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks), then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, and the port number on which the primary control node is accepting connections from peer nodes, among others. The information may also be provided in a configuration file, transmitted over a secure shell tunnel, or received from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
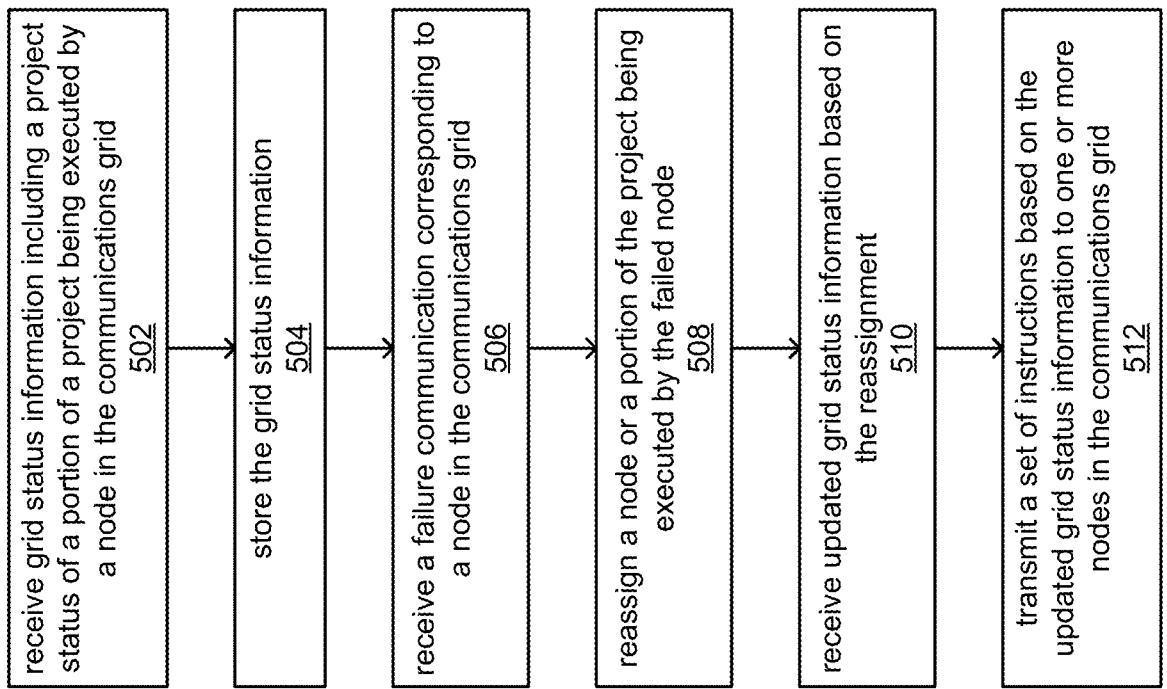
FIG. 5 illustrates a flow chart showing an example process for adjusting a communications grid or a work project in a communications grid after a failure of a node, according to embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
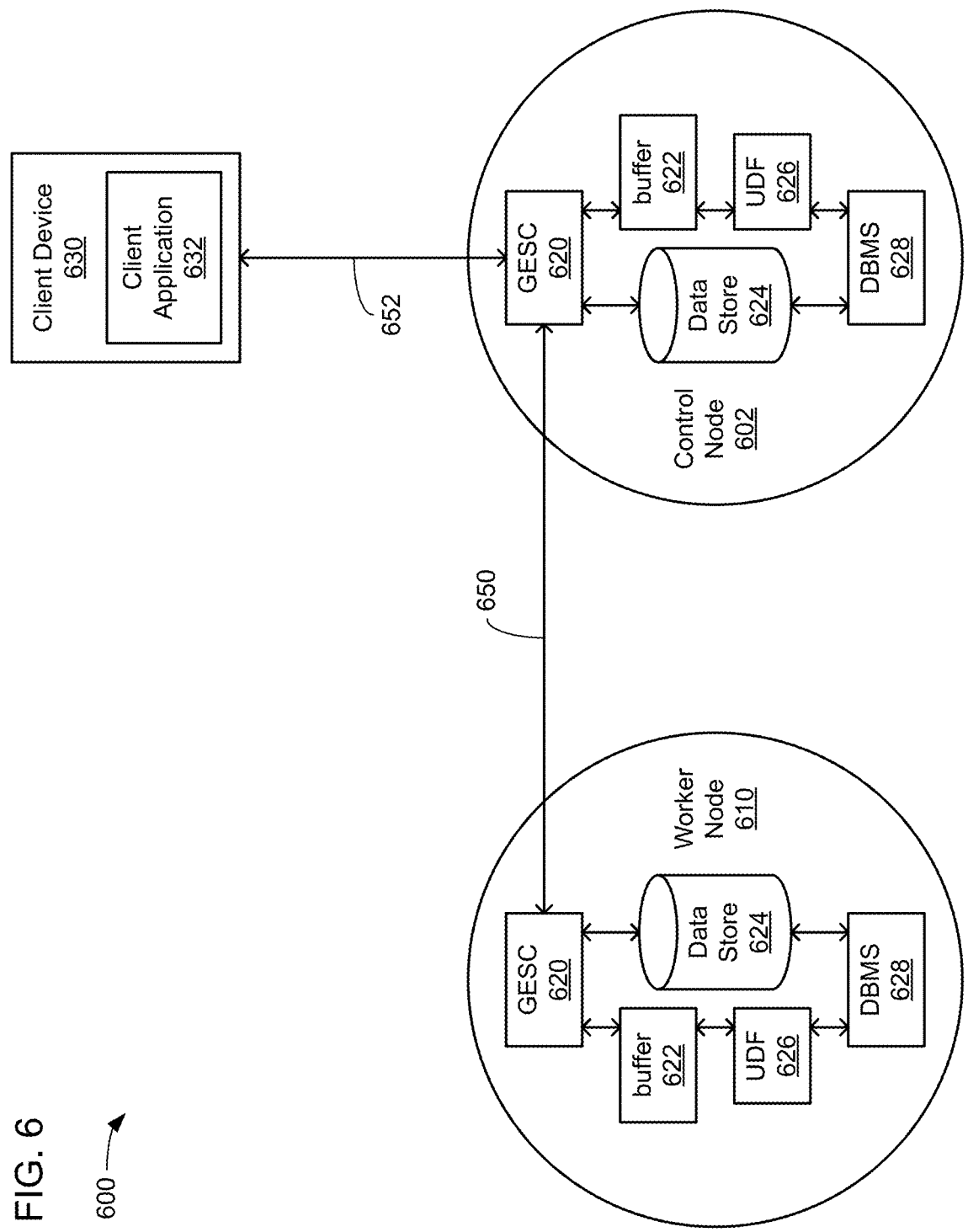
FIG. 6 illustrates a portion of a communications grid computing system including a control node and a worker node, according to embodiments of the present technology.

FIG. 6 illustrates a portion of a communications grid computing system 600 including a control node and a worker node, according to embodiments of the present technology. Communications grid computing system 600 includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS 628. For example, UDF 626 can be invoked by the DBMS 628 to provide data to the GESC 620 for processing. The UDF 626 may establish a socket connection (not shown) with the GESC 620 to transfer the data. Alternatively, the UDF 626 can transfer data to the GESC 620 by writing data to shared memory accessible by both the UDF 626 and the GESC 620.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
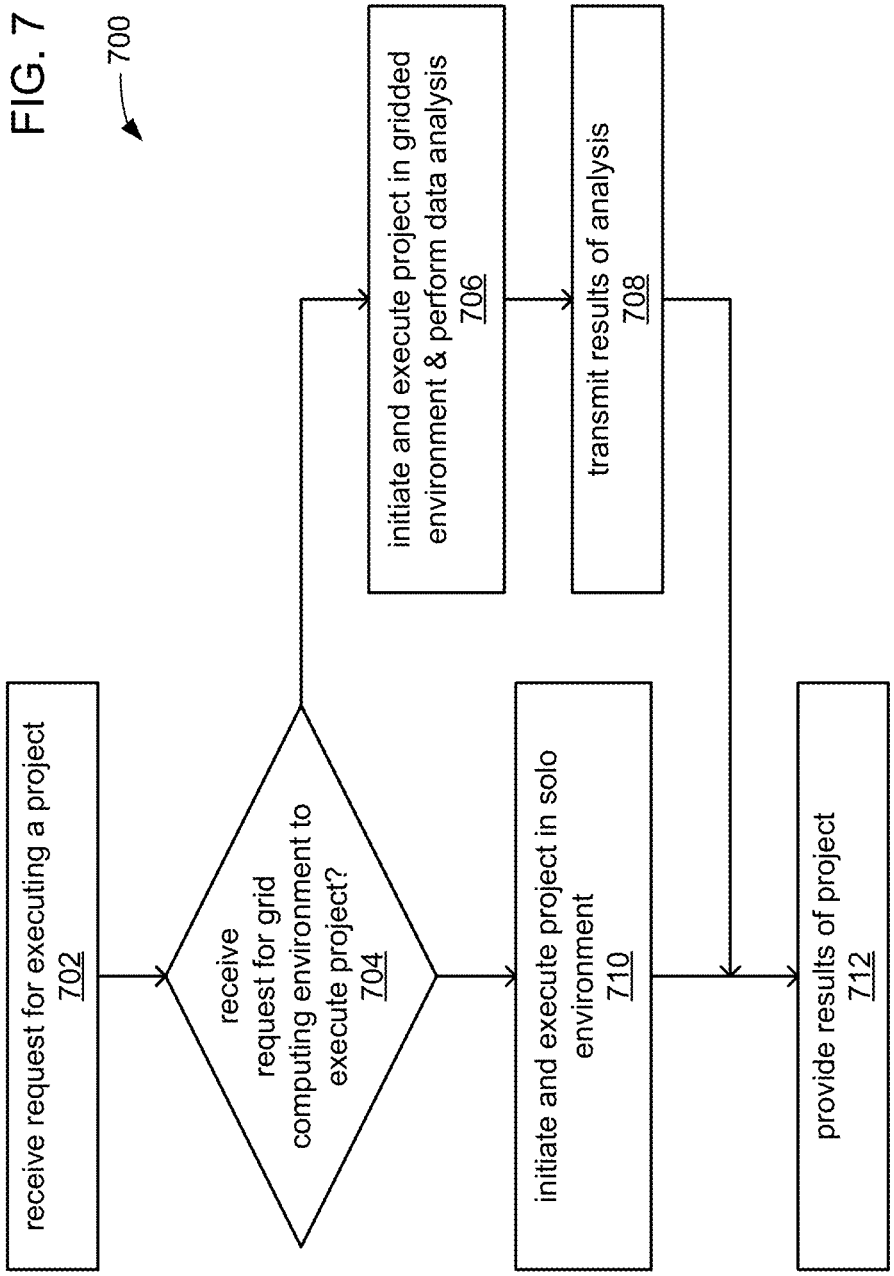
FIG. 7 illustrates a flow chart showing an example method for executing a project within a grid computing system, according to embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
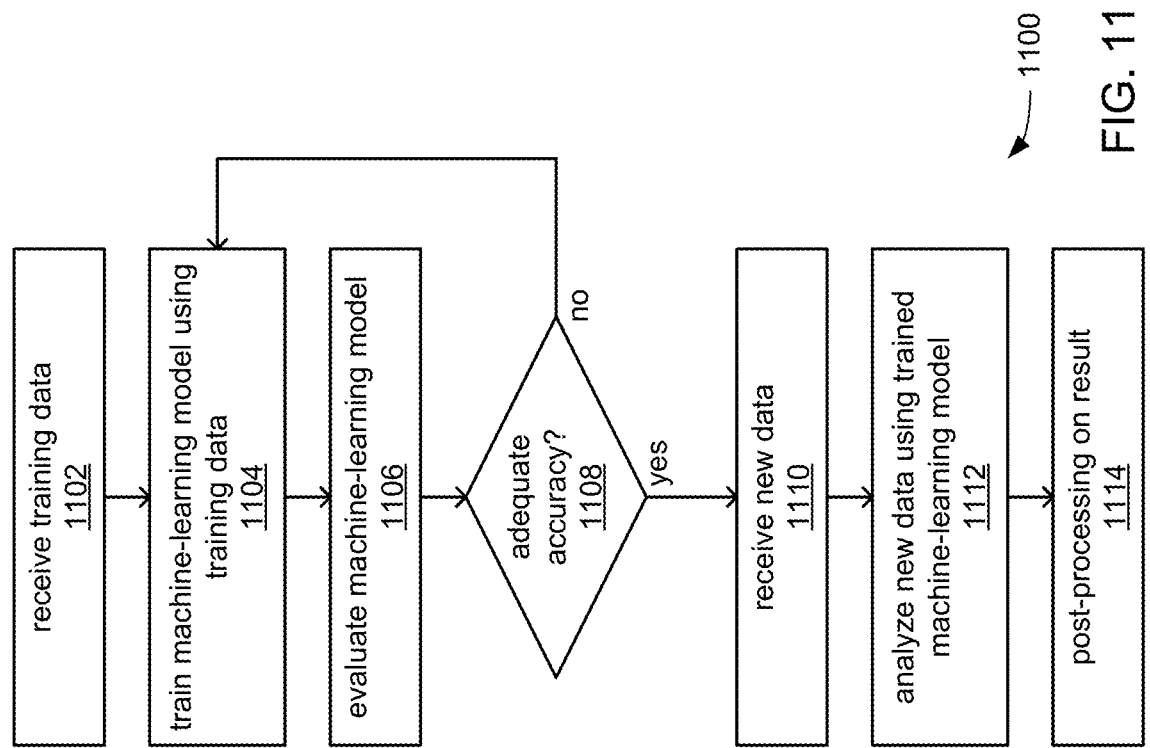
FIG. 11 is a flow chart of an example of a process for generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; chem informatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion;

playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at block 1108, the machine-learning model has an inadequate degree of accuracy for a particular task, the process can return to block 1104, where the machine-learning model can be further trained using additional training data or otherwise modified to improve accuracy. However, if, at block 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
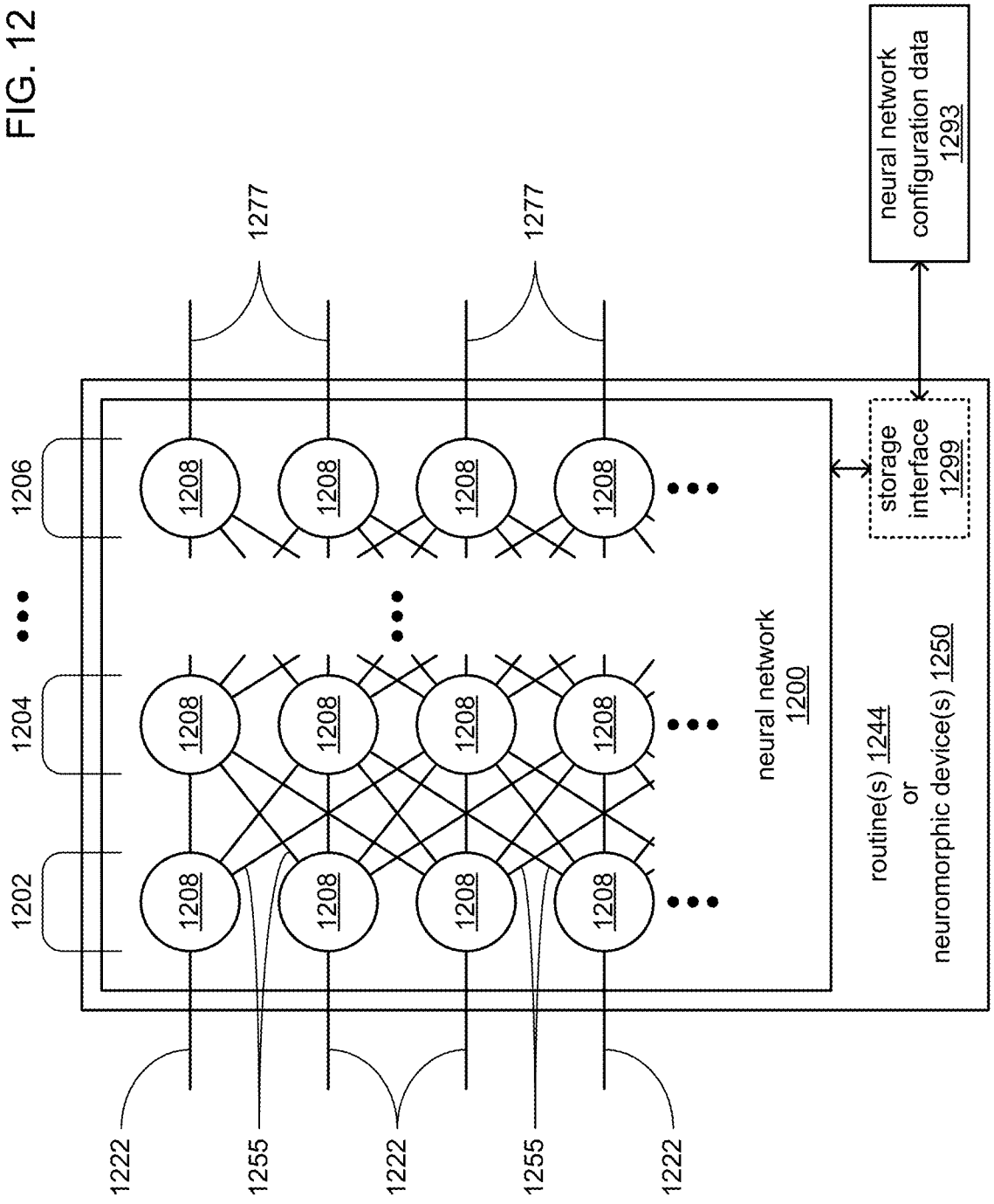
FIG. 12 is an example machine-learning model according to some aspects.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
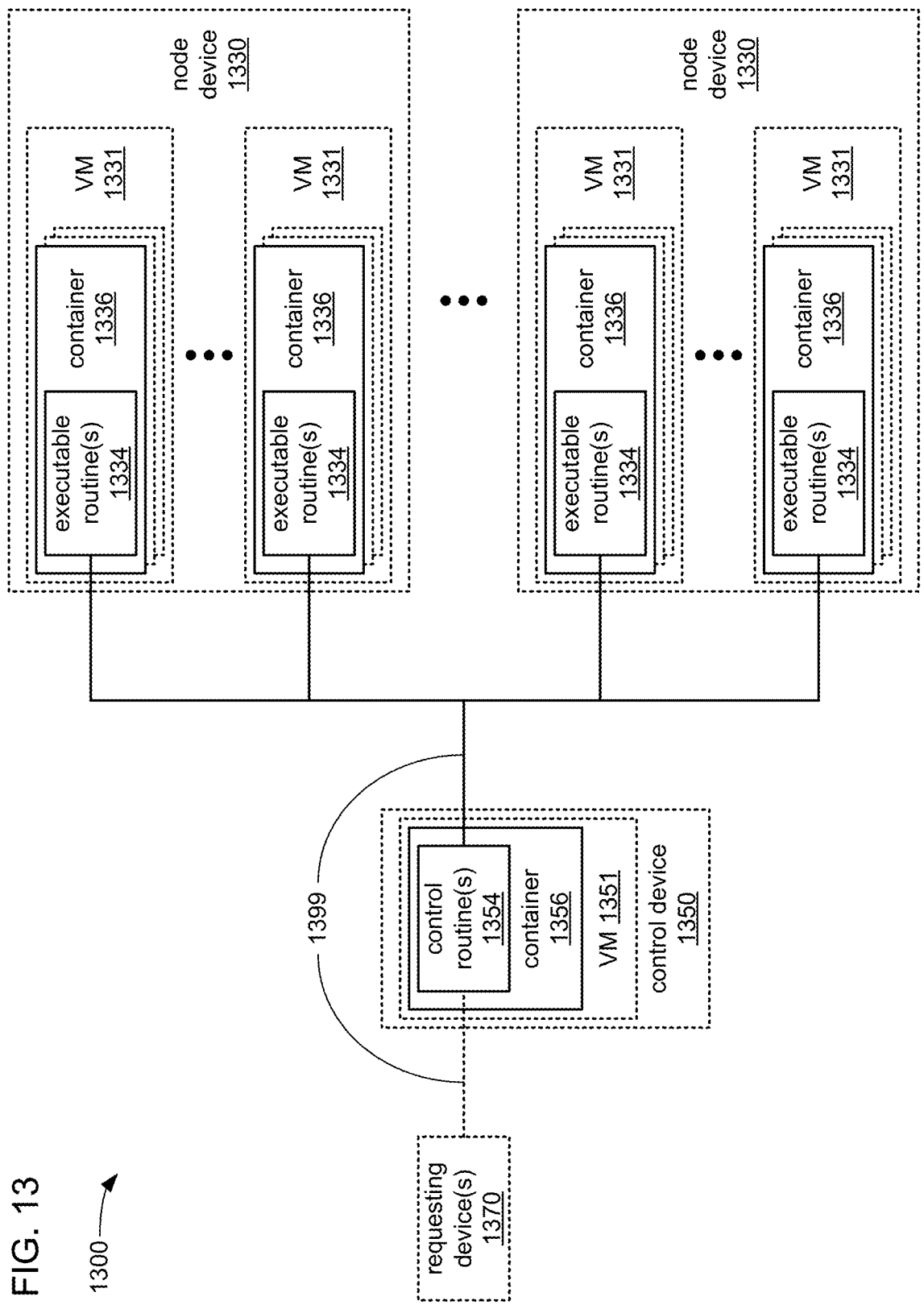
FIG. 13 illustrates various aspects of the use of containers as a mechanism to allocate processing, storage and/or other resources of a processing system to the performance of various analyses according to some aspects.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforementioned grid system 400), the processing, storage and/or other resources of each node device

1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that effects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that all of each such transaction is either entirely performed or is entirely not performed. Allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, Calif., USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Figure 14:
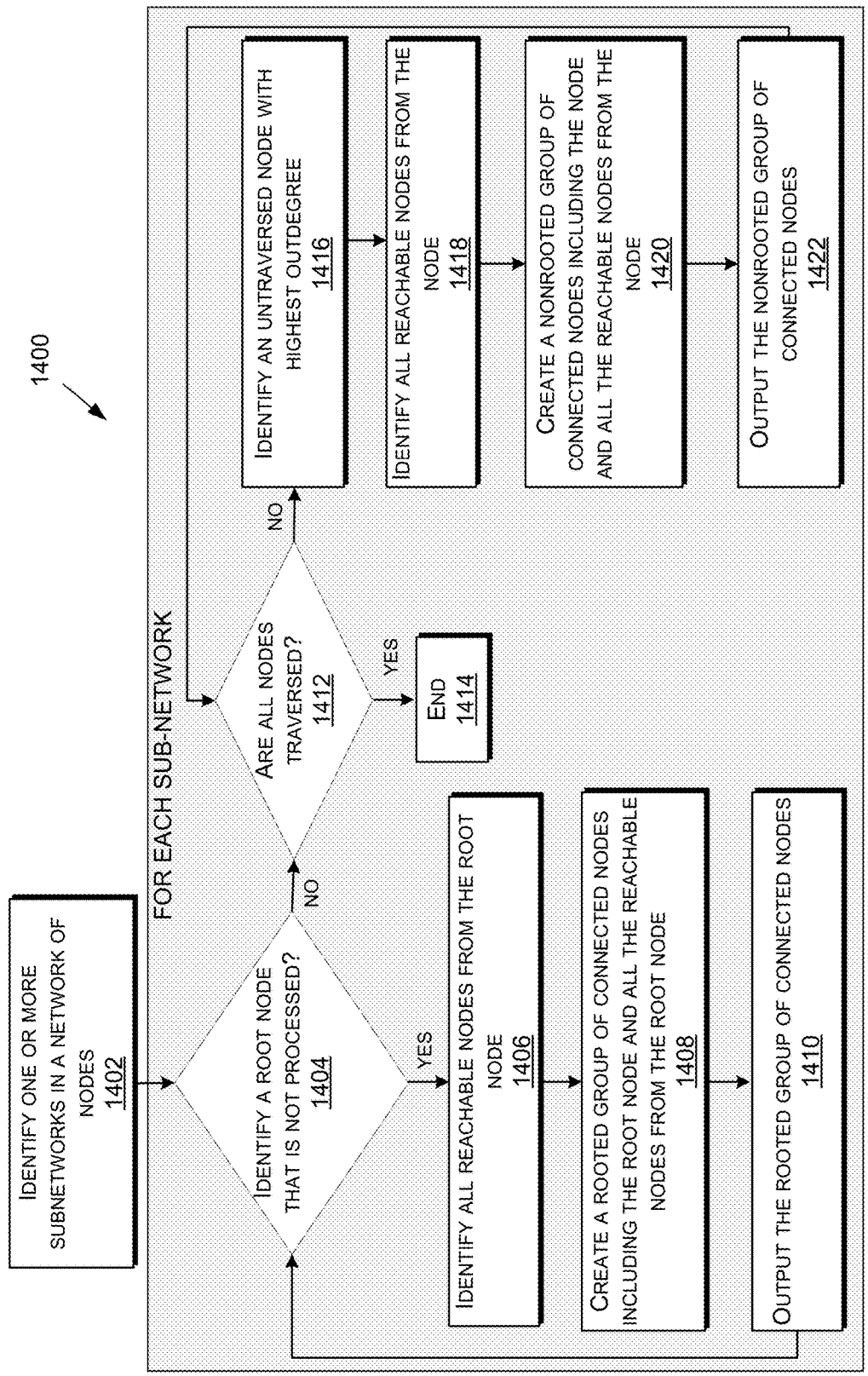
FIG. 14 is a flow chart of an example of a process for identifying groups of connected nodes in a network of nodes according to some aspects.

FIG. 14 depicts a flow chart of an example of a process 1400 for identifying groups of connected nodes in a network of nodes according to some aspects. Although FIG. 14 shows a certain number and sequence of operations for illustrative purposes, it will be appreciated that other examples may include more operations, fewer operations, different operations, or a different order of the operations than is shown in FIG. 14.

At block 1402, a processor identifies one or more subnetworks in a network of nodes. The network of nodes includes two or more nodes and at least one link between the two or more nodes. The two or more nodes represent two or more interconnected objects. The interconnected objects can be physical devices, such as computers, transformers, machines, or other physical devices. Alternatively, or additionally, the interconnected objects can be software, individuals, corporates, banks, and other financial entities. The at least one link is directed, showing the direction of a flow from one node to another. The flow can be electric current flow, data flow, supply of material, etc. The direction of a link may show a dependency between the two nodes connected by the link. For example, when electric current flows from an object (e.g., transformer or generator) represented by node A to an object (e.g., transformer) represented by node B, the object represented by node B depends on the object represented by node A to obtain electric current. Each subnetwork can be an independent group of nodes that is not connected to the other subnetworks in the larger overall network. The network may be processed using a union-find algorithm for identifying the one or more subnetworks. The union-find algorithm can identify connected nodes in a network and determine disjointed sets of the connected nodes. The disjointed sets are subnetworks of the network being processed. Alternatively, or additionally, tree traversal algorithms, such as Depth-First Search (DFS) Algorithms and Breadth-First Search (BFS) Algorithms, can also be used to identify connected nodes and determine disjointed sets as subnetworks. The subnetworks can then be processed (e.g., in parallel) using the techniques shown from block 1404 to block 1422.

At block 1404, the processor determines if it can identify a root node that has not yet been processed. A root node is a parent node that itself has no parent, that is, no incoming link from other nodes and only outgoing links. The processor can check incoming links of the nodes in the network, and the ones without incoming links can be identified as root nodes. Alternatively, the processor can call a function that identifies parent nodes for all the nodes in the network. If the function returns null for certain nodes, these nodes are root nodes. In the context of an electric grid, a distributed energy resource can be a root node from which electric current flows to other nodes such as distribution transformers. If a root node that has not yet been processed can be identified, the process proceeds to block 1406.

At block 1406, the processor identifies all reachable nodes from the root node. A particular node is reachable from a root node if there exists a sequence of links that starts with the root node and ends with the particular node. A tree traversal algorithm can be implemented to identify all the reachable nodes from the root node. Tree Traversal algorithms can be classified broadly in two categories: DFS Algorithms and BFS Algorithms. A DFS algorithm starts with the root node and first visits all nodes of one branch as deep as possible before backtracking and then visits all other branches in a similar fashion. A BFS algorithm starts at the root node and explores all nodes at the present depth level prior to moving on to the nodes at the next depth level. In some examples, a BFS algorithm is implemented to identify all the reachable nodes from a root node.

At block 1408, the processor creates a rooted group of connected nodes including the root node and all the reachable nodes from the root node. The rooted group of connected nodes is a rooted group because all the other nodes in the group are reachable from the root node. Each rooted group can be assigned with a unique identifier.

At block 1410, the processor outputs the rooted group of connected nodes. The root node for the rooted group of connected nodes can be labeled as processed, so that it is not processed again to avoid duplication of work. In some examples, the processor can process some or all of the root nodes in parallel to identify all reachable nodes from each root node, for example until all the root nodes are processed and all the rooted groups of connected nodes are identified, using the process shown in blocks 1406-1410. Once the one or more root nodes are processed, the processor returns to block 1404 to determine if all the root nodes are processed. Rooted groups of connected nodes may overlap, for example when some nodes can be reached by more than one root node.

When the processor determines that all the root nodes have been processed (e.g., the processor cannot identify a root node that is not processed), processing proceeds to block 1412. Alternatively, in other examples processing may proceed to block 1412 for other reasons, such as in response to a stopping condition being satisfied. One example of the stopping condition may be that a threshold number of root nodes have been processed.

At block 1412, the processor determines if all nodes have been traversed in the subnetwork. A node may be considered "traversed" when the node has been analyzed and included in a group of connected nodes, either a rooted group or a nonrooted group. In some examples, a subnetwork may still have untraversed nodes after all rooted groups of connected nodes are identified. In this situation, it is likely that the subnetwork includes cycles. A "cycle" is a closed path that starts from a particular node and ends with the same node. If all nodes have not been traversed in the subnetwork, processing proceeds to block 1416. Otherwise, the process can proceed to block 1414 and end.

At block 1416, the processor identifies an untraversed node with highest outdegree among all the untraversed nodes. An "outdegree" of a particular node can refer to the number of outgoing links from the particular node. In some examples, the processor determines the outdegrees of all the untraversed nodes and sorts the untraversed nodes in a descending order of the outdegrees. The untraversed nodes are non-root nodes.

At block 1418, the processor identifies all reachable nodes from the untraversed node. In some examples, a BFS algorithm is implemented to identify all the reachable nodes from the untraversed node. The BFS algorithm starts at the untraversed node and explores all nodes at the present depth level prior to moving on to the nodes at the next depth level.

At block 1420, the processor creates a nonrooted group of connected nodes including the untraversed node and all the reachable nodes from the untraversed node. The nonrooted group of connected nodes are nonrooted groups since none of the nodes in the group is a root node. One or more nodes that are included in a rooted group of connected nodes may be also reached by the untraversed node. Then the one or more nodes are in both the nonrooted group of connected nodes and the rooted group of connected nodes. Thus, a nonrooted group of connected nodes may overlap with a rooted group of connected nodes.

At block 1422, the processor outputs the nonrooted group of connected nodes. The nonrooted group of connected nodes are then labeled as traversed, so that they are not processed again to avoid duplication of work. In some such situations, the nonrooted group is a subgroup of another nonrooted group created from a previous iteration. Then, the nonrooted group created in this iteration is ungrouped and not counted in the total number of nonrooted groups. In some such situations, another nonrooted group created from a previous iteration is a subgroup of the nonrooted group created in this iteration. Then the nonrooted group created from the previous iteration is ungrouped and not counted into the total number of nonrooted groups. After completing block 1422, the processor can return to block 1412 to process the next untraversed node, for example in the descending order of outdegrees, and iterates blocks 1416-1422. This process can repeat until the processor determines that all the nodes are traversed. If all nodes are traversed in the subnetwork, the processor proceeds to block 1414 to end the process. In this way, the processor identifies all the nonrooted groups of connected nodes. In other examples, the process can iterate until some other stopping condition is satisfied. One example of the stopping condition can be that a threshold number of nodes have been traversed.

Figure 15:
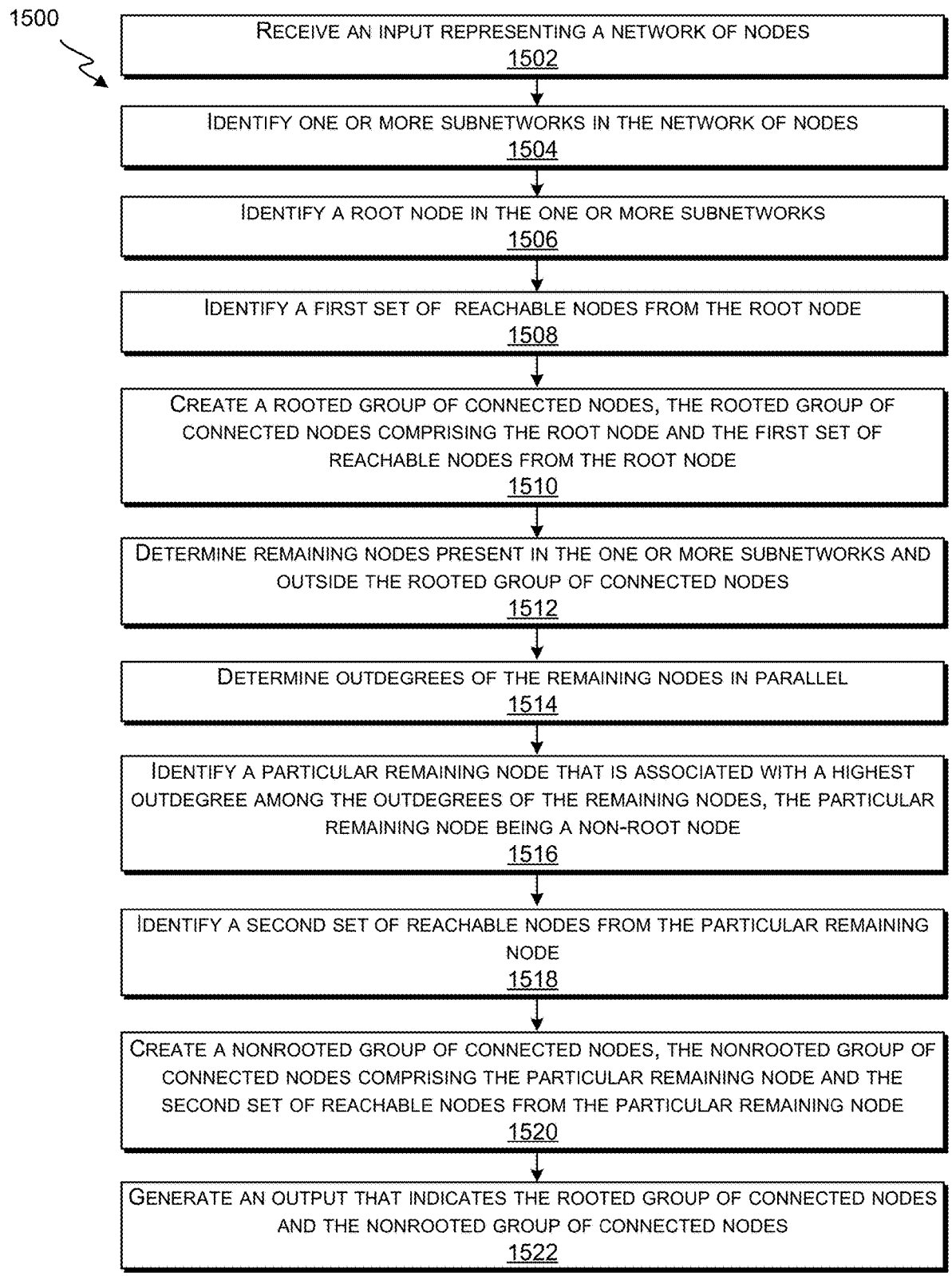
FIG. 15 is a flow chart of an example of a process for identifying a rooted groups of connected nodes and a nonrooted group of connected nodes in a network of nodes according to some aspects.

FIG. 15 depicts a flow chart of an example of a process 1500 for identifying a rooted groups of connected nodes and a nonrooted group of connected nodes in a network of nodes according to some aspects. At block 1502, a processor receives an input representing a network of nodes. The network of nodes includes two or more nodes and at least one link between the two or more nodes. In some examples, the input is in a form of a network graph defining the network of nodes. The network graph is directed. In some examples, the input is in a form of a table defining the network of nodes. The table can list the nodes and the directions of the links between the nodes. For example, when a link from node A to node B, the table can list node A as a parent node and node B as a child node.

At block 1504, the process identifies one or more subnetworks in the network of nodes. Similar to block 1402, the one or more subnetworks are not connected to each other. The one or more subnetworks can be processed in parallel for identifying groups of connected nodes.

Similar to blocks 1404-1408, blocks 1506-1510 describe a process of creating a rooted group of connected nodes. At block 1506, the processor identifies a root node in the one or more subnetworks. In some examples, the processor identifies all root nodes in the one or more subnetworks by processing the one or more subnetworks in parallel.

At block 1508, the processor identifies a first set of reachable nodes (e.g., child nodes) from the root node. The first set of reachable nodes can be all the reachable nodes from the root node. Alternatively, the first set of reachable nodes can be a subset of all the reachable nodes from the root node. In some examples, the processor processes all the root nodes in parallel to identify respective reachable nodes.

At block 1510, the processor creates a rooted group of connected nodes. The rooted group of connected nodes can include the root node and the first set of reachable nodes from the root node. The rooted group of connected nodes can be labeled with a unique identifier.

In block 1512, the processor determines remaining nodes present in the one or more subnetworks and outside the rooted group of connected nodes. If the remaining nodes include another root node, the process can return to block 1506 and iterate to generate another rooted group of connected nodes. Eventually, there may be no more root nodes left to process. In the case where the remaining nodes do not include a root node, a different technique can be performed to analyze the remaining nodes, as illustrated from block 1514 to 1520. In these examples, the remaining nodes may include a cycle of nodes, which is a closed loop starting from one remaining node and ending at the same remaining node.

In block 1514, the processor determines outdegrees of the remaining nodes in parallel. An outdegree of a remaining node is the number of outgoing links from the remaining node. The outdegree of a remaining node can be an integer equal to or greater than 0.

In block 1516, the processor identifies a particular remaining node that is associated with a highest outdegree among the outdegrees of the remaining nodes. The particular remaining node is a non-root node. The highest outdegree is equal to or greater than 1.

In block 1518, the processor identifies a second set of reachable nodes (e.g., child nodes) from the particular remaining node. In some examples, the second set of reachable nodes includes all the reachable nodes from the particular remaining nodes. In some examples, the second set of reachable nodes includes a subset of all the reachable nodes from the particular remaining nodes.

In block 1520, the processor creates a nonrooted group of connected nodes. The nonrooted group of connected nodes can be labeled with a unique identifier. The nonrooted group of connected nodes comprises the particular remaining node and the second set of reachable nodes from the particular remaining node. The nonrooted group of connected nodes can include at least one cycle of nodes.

In some examples, the processor identifies all reachable nodes from the remaining nodes by processing the remaining nodes in a descending order of outdegrees, to thereby create nonrooted groups of connected nodes for all remaining nodes and their respective reachable nodes. Some nonrooted groups of connected nodes may be subgroups of other nonrooted groups. For example, if a first nonrooted group is completely included in a second nonrooted group, then the processor may ungroup the first nonrooted group and not count or report it toward the total number of nonrooted groups.

In block 1522, the processor generates an output that indicates the rooted group of connected nodes and the nonrooted group of connected nodes. In some examples, the processor can cause the rooted group of connected nodes and the nonrooted group of connected nodes to be displayed in a visual format in a graphical user interface (GUI). The visual format can be a graph displaying all the rooted groups and all the nonrooted groups in the network of nodes.

FIG. 16 is a flow chart of an example of a process 1600 for determining a risk value for a network of nodes and executing one or more remedial measures to reduce risks for the network of nodes according to some aspects. After identifying rooted groups of connected nodes and nonrooted groups of connected nodes as illustrated in FIG. 14 or FIG. 15, the processor may determine a risk value for the network of nodes and execute one or more remedial measures to reduce the risk for the network of nodes. At block 1602, the processor determines a first set of risk values for a first number of rooted groups of connected nodes in the network of nodes, a risk value for each rooted group being determined based on a particular number of nodes in each rooted group and attributes of the particular number of nodes in each rooted group. The risk value for a rooted group can be determined by using a cost function, where risk levels for corresponding nodes are weighted. The risk level of each node can be determined based on attributes of the node, for example, vulnerability conditions for attacks or failures. The attributes can be part of the input received by the processor initially at block 1502, as described earlier with respect to FIG. 15. Alternatively, or additionally, the attributes can be updated periodically; and new attributes can be collected as they appear to become a factor affecting the risk level of a node. The weight for the risk level of each node in the cost function can be based on the number of reachable nodes (e.g., child nodes) of the node and how strong the dependencies by the reachable nodes are. For example, the weight for the root node is generally greater than the weights for all the other nodes in the rooted group, that is, its reachable nodes (e.g., child nodes), since all other nodes in the rooted group depend on the root node. Among the reachable nodes of the root node, the weight for a reachable node with more child nodes may be greater than that of another reachable node with less child nodes, and the weight for a reachable node which has child nodes with stronger dependencies may be great than that for other reachable nodes. A reachable node without any outgoing links (e.g., no child nodes) may not be considered in the cost function, since it may not pose a risk (e.g., the weight is 0) to the rooted group.

At block 1604, the processor determines a second set of risk values for a second number of nonrooted groups of connected nodes in the network of nodes, a risk value for each nonrooted group based on a particular number of nodes in each nonrooted group and attributes of the particular number of nodes in each rooted group. Similar to block 1602, the risk value for a nonrooted group can be determined using a cost function, where risk levels for corresponding nodes are weighted. The risk level of each node can be determined based on attributes of the node. The weight of the risk level for each node can be determined based on the number of reachable nodes from the node and the level of dependency by the reachable nodes from the node.

In general, the risk value for a nonrooted group can be lower than that for a rooted group assuming the two groups have the same number of nodes, and each node has the same attributes. Because the root node can affect all other nodes in the rooted group, which may serve as a single point of failure that could lead to the failure of the entire rooted group. On the other hand, a nonrooted group does not have a root node and may have more links between the nodes.

At block 1606, the processor determines a risk value for the network of nodes based on the first set of risk values for the first number of rooted groups and the second set of risk values for the second number of nonrooted groups. Similar to blocks 1602 and 1604, a cost function may be implemented to calculate the risk value for the network of nodes. The risk value for each rooted group and nonrooted group is weighted in the cost function. The weight for the risk value for each rooted group or nonrooted group can be based on the number of nodes in each group. For example, the more nodes each group has, the greater the weight is. The processor may determine the risk value periodically or when there is a major attribute change.

At block 1608, the processor compares the risk value to a predetermined threshold. Whenever the risk value for the network of node is determined at block 1606, the processor can then compare the risk value to a predetermined threshold. The predetermined threshold can be recommended by the processor automatically or set by a user input.

At block 1610, the processor automatically generates a warning signal in response to determining that the risk value meets or exceeds the predetermined threshold. The warning signal can be transmitted to the operator of a system represented by the network of nodes with the comparison result. If the difference between the risk value for the network of nodes and the predetermined threshold is within a tolerance range, the processor may not do anything else but keep monitoring the network. If the difference between the risk value for the network of nodes and the predetermined threshold is beyond the tolerance range, the processor may proceed to the block 1612.

At block 1612, the processor executes one or more remedial measures configured to reduce the risk value for the network of nodes. The processor may reconfigure the interconnections within the network to reduce the risk value of the network based on the risk values for the rooted and nonrooted groups and their weights in determining the risk value for the network. For example, an incoming link from a node with lower risk value can be added to a root node, which poses higher risk than other root nodes, to neutralize or compensate the risk at the root node. This way, the rooted group containing the root node can be merged with another group. Alternatively, or additionally, the processor may isolate a particular node with the highest risk level (e.g., posing great risk to other nodes) and connect the particular node's child nodes to another node with a low risk level. Still alternatively, or additionally, attributes of certain nodes with high risk levels may be improved to reduce the risk level of the particular nodes. In the context of distribution grid, a distribution transformer may be serviced or replaced with a new one to reduce potential failures. The processor may determine the updated number of rooted groups and nonrooted groups based on the methods illustrated in FIG. 14 or 15; and determine the risk value for the reconfigured network is below the predetermined threshold following the steps from block 1602.

FIG. 17 depicts a node-link diagram 1702 and a table 1704 representing an example of a network of nodes according to some aspects. Node-link diagram 1702 includes 7 nodes, nodes A, B, C, D, E, and F, and 5 directional links between them. The links can be unidirectional. For example, the link between node A and node B is from node A to node B. Similarly, the link between node A and node C is from node A to node C, the link between node C and node E is from node C to node E, and the link between node E and node F is from node F to node E. The links can also be bidirectional. For example, the link between node C and node D is in both directions. The direction of a link can represent a dependency. For example, the link from node A to node B represents node B depends on node A. In other words, changes at node A can affect node B. As another example, the link between node C and node D represents that node C and node D are interdependent. Changes at node C can affect node D and changes at node D can affect node C.

Table 1704 defines the same network of nodes as shown in node-link diagram 1702. The PARENT_ID column lists the parent nodes at which the links start. The CHILD_ID column lists the child nodes at which the links end. The DEPENDENCY_TYPE column indicates the dependency between two nodes. The dependency can be ONE-WAY. For example, the link from parent node A to child node B is one way, indicating that the dependency between node A and node B is one way. In other words, child node B depends on parent node A, but parent node A does not depend on child node B. The dependency can also be MUTUAL. For example, node C and node D are both listed as parent nodes and child nodes. In other words, node C can be a parent node, on which node D depends; node D can also be a parent node, on which node C depends. The three columns, PARENT_ID, CHILD_ID, and DEPENDENCY_TYPE, are the primary inputs. There may be other columns, for example an ATTRIBUTE_1 column can describe the qualitative or quantitative attributes of the relationship between two nodes for specific applications. As another example, an ATTRIBUTE_2 column can describe the attributes of each parent node in the PARENT_ID column. These attributes may be used to identify meaningful dependencies that are to be fed to the methods described in processes 1400, 1500, and 1600.

For example, the network of nodes described by the node-link diagram 1702 and the table 1704 can be a microgrid, which is a type of distribution power grid. Node A can represent one or more wind turbines providing electricity to the microgrid, node F can represent one or more solar panels providing electricity to the microgrid. Node B can represent a distribution transformer receiving electricity from the one or more wind turbines represented by node A on one side and providing electricity to power consuming devices connected on the other side. Similarly, node E can represent a distribution transformer. Node C can represent an energy storage device, which can store electric energy received from the one or more wind turbines represented by node A, functioning similar to a load device, and can also release energy when needed to devices represented by node D and node E, functioning similar to an energy resource. Similarly, node D can represent an energy storage device, which can store energy received from the energy storage device represented by node C and also release energy to the energy storage device represented by node C.

Figure 18:
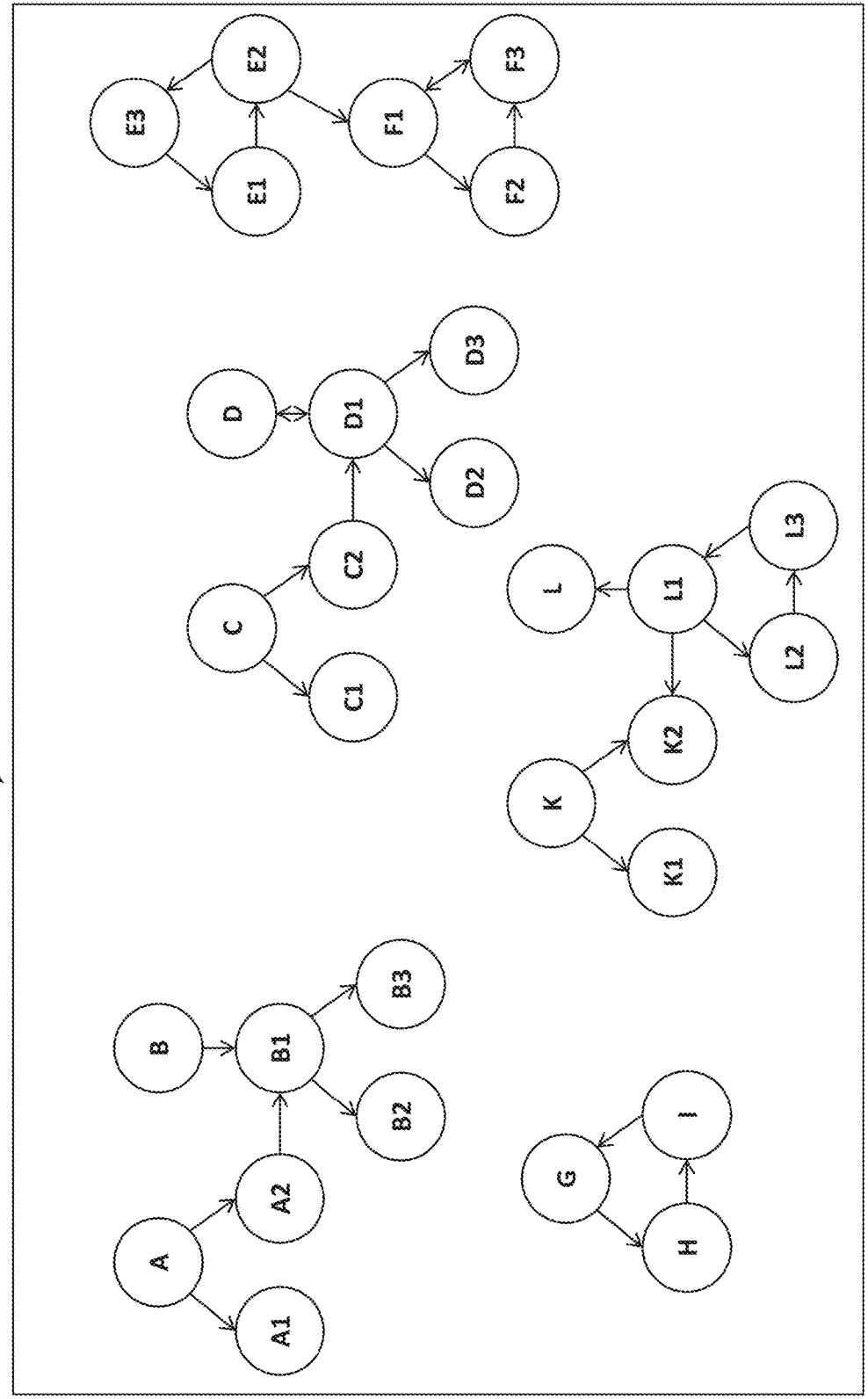
FIG. 18 depicts a node-link diagram of an example of a network of nodes according to some aspects.

FIG. 18 depicts a node-link diagram 1800 of an example of a network of nodes according to some aspects. Similar to node-link diagram 1702, node-link diagram 1800 includes multiple nodes and directional links between them. The difference is that some groups of nodes in node-link diagram 1800 are not connected to other groups of nodes—rather, they are isolated from one another. These isolated groups of nodes form their own subnetwork within the larger overall network represented as node-link diagram 1800.

Figure 19:
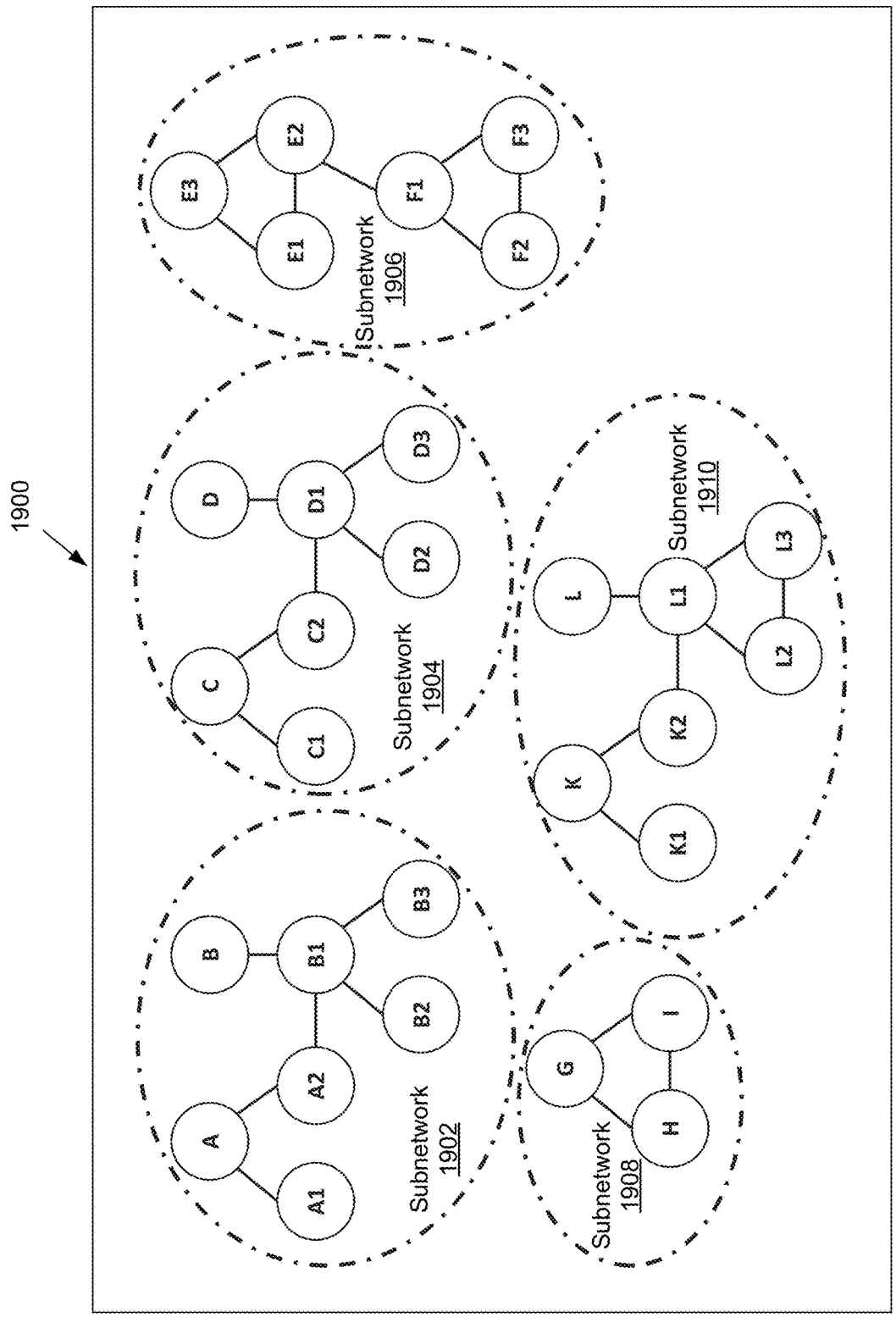
FIG. 19 depicts a node-link diagram showing examples of subnetworks in the network of nodes illustrated in FIG. 18 according to some aspects.

FIG. 19 depicts a node-link diagram 1900 showing examples of the subnetworks described above with respect to FIG. 18 according to some aspects. When identifying subnetworks in a larger network of nodes, the directions of the links do not matter. The network can be considered as an undirected and unweighted node-link diagram 1900. When one group of nodes is detected as not connecting with all the other nodes in the network, that group of nodes can be considered a subnetwork. The node-link diagram 1900 includes 5 subnetworks, including subnetwork 1902, subnetwork 1904, subnetwork 1906, subnetwork 1908, and subnetwork 1910. For example, the network of nodes depicted in the node-link diagram 1900 can be a distribution grid including multiple microgrids as subnetworks 1902-1910, which are similar to the microgrid depicted in node-link diagram 1702.

Figure 20:
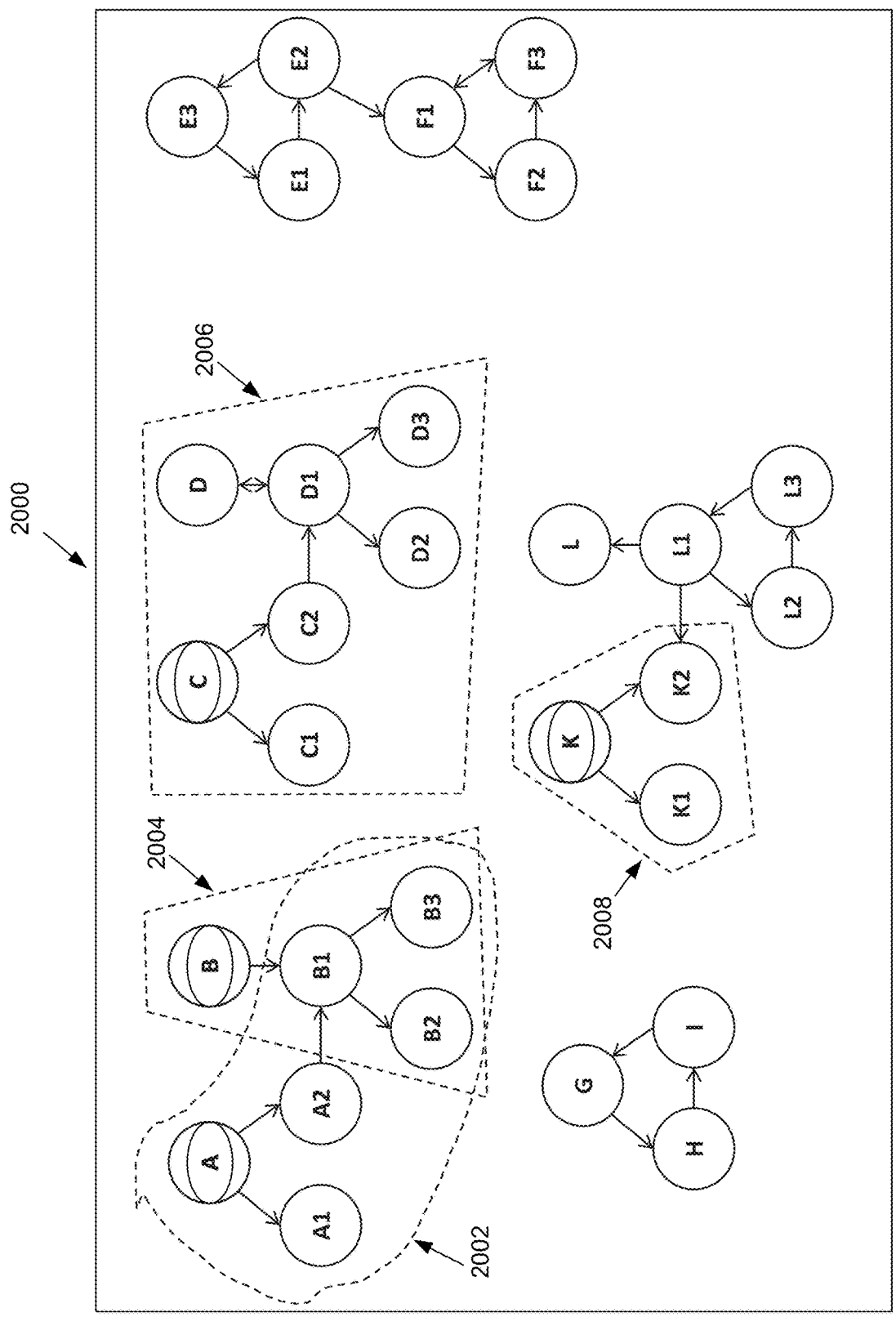
FIG. 20 depicts a node-link diagram showing examples of rooted groups of connected nodes derived from the subnetworks of FIG. 19 according to some aspects.

FIG. 20 depicts a node-link diagram 2000 showing examples of rooted groups of connected nodes derived from the subnetworks of FIG. 19 according to some aspects. The subnetworks 1902-1910 can be processed in parallel to identify the root nodes. A root node is a parent node that has only outgoing links and no incoming links. In subnetwork 1902, node A and node B are identified as root nodes. In subnetwork 1904, node C is identified as a root node. In subnetwork 1906, no root node is identified. In subnetwork 1908, no root node is identified. In subnetwork 1910, node K is identified as a root node.

Each root node can reach at least one other node. A particular node is reachable from a root node if there exists a sequence of links that starts with the root node and ends with the particular node. A root node and all its reachable nodes can form a rooted group of connected nodes. For example, root node A can reach nodes A1, A2, B1, B2, and B3, but root node A cannot reach node B because of the unidirectional link from node B to node B1. Thus, root node A and all its reachable nodes A1, A2, B1, B2, and B3 form a rooted group of connected nodes 2002. Similarly, root node B and all its reachable nodes B1, B2, and B3 form a rooted group 2004; root node C and all its reachable nodes C1, C2, D1, D2, D3, and D form a rooted group 2006; and root node K and all its reachable nodes K1 and K2 form a rooted group 2008. Rooted groups can overlap. That is, a node may be reached by more than one node and thus belong to more than one rooted group. For example, nodes B1, B2, and B3 are part of rooted group 2002 and part of rooted group 2004.

Figure 21:
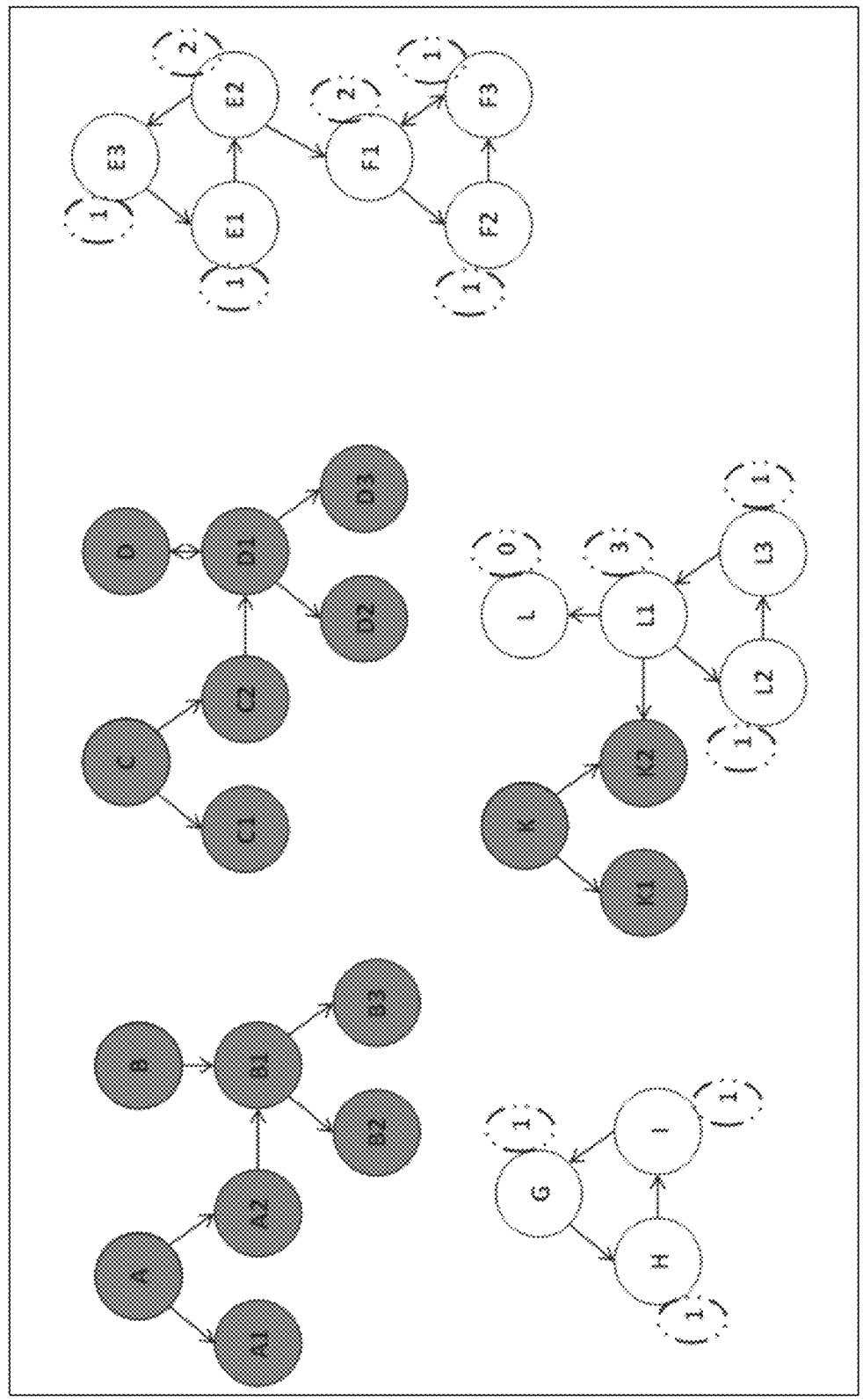
FIG. 21 depicts a node-link diagram showing examples of outdegrees of non-root nodes in the network of nodes illustrated in FIG. 18 according to some aspects.

FIG. 21 depicts a node-link diagram 2100 showing examples of outdegrees of non-root nodes, in the network of nodes illustrated in FIG. 18, according to some aspects. The remaining nodes present in the network of nodes and outside the rooted groups of connected nodes usually include cycles. A cycle is a closed trail of links that starts with one node and ends with the same node. For example, node E1, node E2, and node E3 form a cycle. Similarly, nodes F1, F2, and F3 form a cycle; nodes L1, L2, and L3 form a cycle; and node H, I, and G form a cycle. Since cycles do not have root nodes and the reach of any node of a cycle covers the entire cycle, the approach for identifying rooted groups of connected nodes illustrated in FIG. 18 is not effective for non-root nodes. Thus, a different approach is used to identify groups of connected nodes in the remaining non-root nodes, especially those involving cycles.

Node-link diagram 2100 shows all the rooted groups of connected nodes in gray and every remaining node with an outgoing degree ("outdegree"). The outdegree of a particular node refers to the number of outgoing links from the particular node. In other words, the outdegree represents how many child nodes are connected to the particular node. For example, node L1 has 3 outgoing links, connecting to node L, node L2, and node K2. So, the outdegree of node L1 is 3. Also as an example, node L has 0 outgoing links, so the outdegree of node L is 0.

Figure 22:
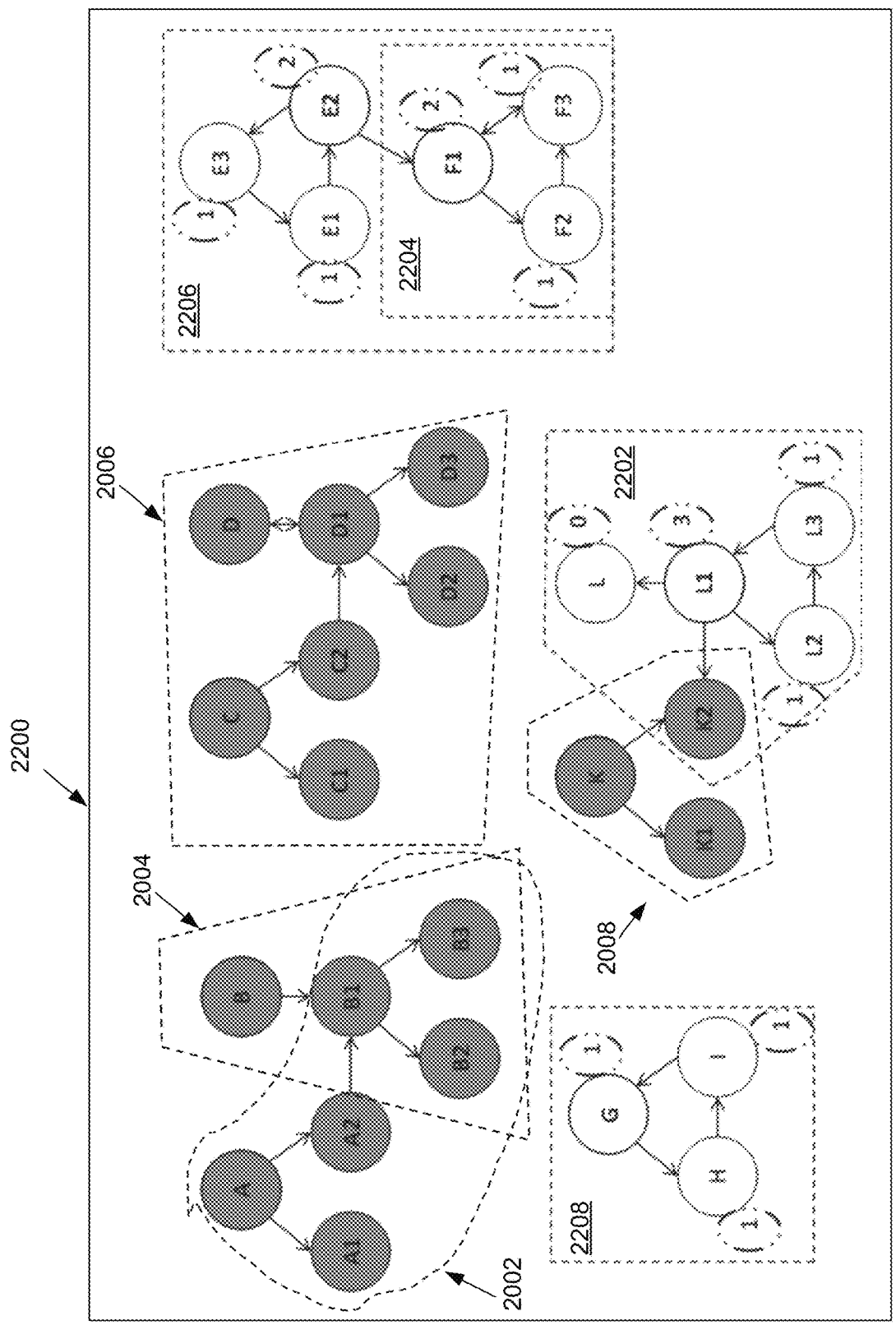
FIG. 22 depicts a node-link diagram showing examples of nonrooted groups of connected nodes in the network of nodes illustrated in FIG. 18 according to some aspects.

FIG. 22 depicts a node-link diagram 2200 showing examples of nonrooted groups of connected nodes, in the network of nodes illustrated in FIG. 18, according to some aspects. The remaining nodes outside the rooted groups of connected nodes can be processed sequentially in the decreasing order of outdegrees. For a node with the highest outdegree in the remaining nodes in a subnetwork, all its reachable nodes can be identified. The node with the highest outdegree and all its reachable nodes can form a nonrooted group of connected nodes. In some cases, the nonrooted group of connected nodes may overlap with a rooted group of connected nodes. For example, one or more nodes are present in both a rooted group of connected nodes and a nonrooted group of connected nodes.

Once a nonrooted group of connected nodes is identified, the nonrooted group is assigned to an identifier and all the nodes in the nonrooted groups are marked as processed. Since no single node can be identified as a parent node in a nonrooted group of connected nodes involving cycles, the node of the highest outdegree can be considered as a representative parent node. For example, node L1 has the highest outdegree, which is 3, among the remaining nodes in subnetwork 1910 as identified in FIG. 19. Node L1 can also reach node L, node L2, node L3, and node K2. Node L1 and its reachable nodes L, L2, L3, and K2 form a nonrooted group of connected nodes 2202. Node L1 can be considered as a representative parent node for the nonrooted group 2202. Node K2 is in both rooted group 2008 and the nonrooted group 2202, thus these two groups overlap. Then the next node of the highest outdegree is identified from the remaining unprocessed nodes in each subnetwork. The reachable nodes from the next node of the highest outdegree can be identified to form a nonrooted group of connected nodes with the next node of the highest outdegree. This way, other nonrooted groups can be formed.

In some examples, multiple remaining nodes in one subnetwork may have the same outdegree. One of those remaining nodes may be chosen first (e.g., randomly or based on some criteria) for processing. Once that node has been processed, another node with the same outdegree may be selected. And so on, until all nodes with the same outdegree have been processed or all remaining nodes are traversed in the subnetwork.

For example, node F1 and node E2 both have the highest outdegree of 2 among the remaining unprocessed nodes in subnetwork 1906 as identified in FIG. 19. If node F1 is processed first, its reachable nodes F2 and F3 can be identified, and a nonrooted group 2204 can be formed with node F1 as the representative parent node. Then node E2 is processed to form a nonrooted group 2206 with all its reachable nodes E1, E3, F1, F2, and F3, where node E2 is a representative parent node. Similarly, all three nodes G, H, and I, which form a cycle, have the same outdegree of 1 in subnetwork 1908 as identified in FIG. 19. If node G is processed first, nodes H and I can be reached by node G, and a nonrooted group 2208 can be formed with node G as the representative parent node. There is no remaining node in subnetwork 1908 after nonrooted group 2208 is formed. If node H or node I is processed first, the same nonrooted group 2208 can be formed with node H or node I as the representative parent node.

There can be situations where certain nonrooted groups of connected nodes are subgroups of (e.g., completely overlap with) other nonrooted groups of connected nodes. The subgroups can be identified and removed from counting. For example, if a representative parent node X of a first nonrooted group of connected nodes is also included in a second nonrooted group of connected nodes where node Y is the representative parent node, the first nonrooted group is a subgroup of the second nonrooted group. This is because if node Y can reach node X, node Y can reach all the nodes that are reachable from node X. Given this overlap, the first nonrooted group can be ignored during the counting process to prevent duplication. Here, since nonrooted group 2204 is a subgroup of nonrooted group 2206, there is a complete overlap between these nonrooted groups. When this type of complete overlap occurs, whichever nonrooted group is smaller in size may be removed from counting. Thus, nonrooted group 2204 can be ungrouped and removed from counting, so that only nonrooted group 2206 is counted.

After identifying nonrooted groups 2202 and 2206, only nodes G, H, and I are left to process. Each has an outdegree of 1. If node G is selected, its reach includes both node H and node I, so a nonrooted group 2208 is formed. Note that the nonrooted group 2208 is a cycle and each node in the cycle can be a representative parent node.

The network of nodes analyzed in FIGS. 18-22 includes 4 rooted groups of connected nodes 2002, 2004, 2006, and 2008 and 3 nonrooted groups of connected nodes 2202, 2206, and 2208. Each group poses a risk to the network. The risk value for each group can be determined by the number of nodes and attributes of the nodes in each group using a cost function. The risk value of the network of nodes can be determined using a cost function, where the risk value of each group is a weighted variable, as described for FIG. 16 above. If the risk value is beyond a predetermined threshold, certain remediation measures can be employed to mitigate the risk. For example, if root node A has a high risk value, it can be connected to node G with an incoming link to root node A. Thus, rooted group 2002 and nonrooted group 2208 can be merged into one nonrooted group. Also as an example, if root node B has a high risk value, it can be isolated by disconnecting node B1 from node B. Alternatively, certain attributes of node B can be improved to reduce the risk level of node B and the risk value of rooted group 2004 containing node B.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processors; and
one or more memory devices including instructions that are executable by the one or more processors for causing the one or more processors to:
receive an input representing a network of nodes, wherein the network of nodes is a directed network of nodes;
identify one or more subnetworks in the network of nodes, wherein the one or more subnetworks are not connected to each other;
identify a root node in the one or more subnetworks, wherein the root node is a node that has no incoming links in the one or more subnetworks;
identify a first set of reachable nodes from the root node;
create a rooted group of connected nodes, wherein the rooted group of connected nodes comprises the root node and the first set of reachable nodes from the root node;
determine remaining nodes that are present in the one or more subnetworks and outside of the rooted group of connected nodes;
determine outdegrees of the remaining nodes in parallel, wherein each of the outdegrees is a number of outgoing links from a corresponding one of the remaining nodes;
identify a particular remaining node that is associated with a highest outdegree among the outdegrees of the remaining nodes, wherein the particular remaining node is a non-root node;
identify a second set of reachable nodes from the particular remaining node;
create a nonrooted group of connected nodes, wherein the nonrooted group of connected nodes comprises the particular remaining node and the second set of reachable nodes from that particular remaining node; and
generate an output that indicates the rooted group of connected nodes and the nonrooted group of connected nodes.

2. The system of claim 1, wherein the input is in a form of a network graph defining the network of nodes, wherein the network graph is directed.

3. The system of claim 1, wherein the input is in a form of a table defining the network of nodes.

4. The system of claim 1, wherein two or more nodes in the network of nodes represent two or more objects, and wherein at least one link between the two or more nodes represents an interdependency between the two or more objects.

5. The system of claim 1, wherein the one or more memory devices further include instructions that are executable by the one or more processors for causing the one or more processors to:
identify the one or more subnetworks using a union-find algorithm.

6. The system of claim 1, wherein the one or more memory devices further include instructions that are executable by the one or more processors for causing the one or more processors to:
identify all root nodes in the one or more subnetworks by processing the one or more subnetworks in parallel; and
identify all reachable nodes from all the root nodes in parallel.

7. The system of claim 1, wherein the nonrooted group of connected nodes comprises at least one cycle of nodes.

8. The system of claim 1, wherein the one or more memory devices further include instructions that are executable by the one or more processors for causing the one or more processors to:
identify all reachable nodes from the remaining nodes by processing the remaining nodes in a descending order of the outdegrees in each subnetwork; and
include all the reachable nodes into nonrooted groups of connected nodes.

9. The system of claim 8, wherein the nonrooted group of connected nodes is a first nonrooted group of connected nodes, and wherein the one or more memory devices further include instructions that are executable by the one or more processors for causing the one or more processors to:
determine that the first nonrooted group of connected nodes is a subgroup of a second nonrooted group of connected nodes among the nonrooted groups of connected nodes; and
ungroup the first nonrooted group of connected nodes.

10. The system of claim 1, wherein the one or more memory devices further include instructions that are executable by the one or more processors for causing the one or more processors to:
cause the rooted group of connected nodes and the nonrooted group of connected nodes to be displayed in a visual format in a graphical user interface (GUI).

11. The system of claim 1, wherein the one or more memory devices further include instructions that are executable by the one or more processors for causing the one or more processors to:
identify the first set of reachable nodes from the root node using a breadth-first-search algorithm; and
identify the second set of reachable nodes from the particular remaining node using the breadth-first-search algorithm.

12. The system of claim 1, wherein the one or more memory devices further include instructions that are executable by the one or more processors for causing the one or more processors to:
determine a risk value associated with the network of nodes, wherein the risk value is determined based at least in part on how many rooted groups of connected nodes and nonrooted groups of connected nodes are present in the network of nodes, wherein the risk value represents an amount of risk exposed to the network of nodes;
compare the risk value to a predetermined threshold; and
in response to determining that the risk value meets or exceeds the predetermined threshold:
automatically generate a warning signal; and
execute one or more remedial measures configured to reduce the amount of risk associated with the network of nodes.

13. The system of claim 12, wherein the one or more remedial measures comprises reconfiguring the network of nodes so that the risk value is smaller than the predetermined threshold.

14. A method, comprising:
receiving, by one or more processors, an input representing a network of nodes, wherein the network of nodes is a directed network of nodes;
identifying, by the one or more processors, one or more subnetworks in the network of nodes, wherein the one or more subnetworks are not connected to each other;
identifying, by the one or more processors, a root node in the one or more subnetworks, wherein the root node is a node that has no incoming links in the one or more subnetworks;
identifying, by the one or more processors, a first set of reachable nodes from the root node;
creating, by the one or more processors, a rooted group of connected nodes, wherein the rooted group of connected nodes comprises the root node and the first set of reachable nodes from the root node;
determining, by the one or more processors, remaining nodes that are present in the one or more subnetworks and outside of the rooted group of connected nodes;
determining, by the one or more processors, outdegrees of the remaining nodes in parallel, wherein each of the outdegrees is a number of outgoing links from a corresponding one of the remaining nodes;
identifying, by the one or more processors, a particular remaining node that is associated with a highest outdegree among the outdegrees of the remaining nodes, wherein the particular remaining node is a non-root node;
identifying, by the one or more processors, a second set of reachable nodes from the particular remaining node;
creating, by the one or more processors, a nonrooted group of connected nodes, wherein the nonrooted group of connected nodes comprises the particular remaining node and the second set of reachable nodes from that particular remaining node; and
generating, by the one or more processors, an output that indicates the rooted group of connected nodes and the nonrooted group of connected nodes.

15. The method of claim 14, wherein the input is in a form of a network graph defining the network of nodes, wherein the network graph is directed.

16. The method of claim 14, wherein the input is in a form of a table defining the network of nodes.

17. The method of claim 14, wherein two or more nodes in the network of nodes represent two or more objects, and wherein at least one link between the two or more nodes represents an interdependency between the two or more objects.

18. The method of claim 14, further comprising:
identifying the one or more subnetworks using a union-find algorithm;

identifying all root nodes in the one or more subnetworks by processing the one or more subnetworks in parallel; and identifying all reachable nodes from all the root nodes in parallel.

19. The method of claim 14, wherein the nonrooted group of connected nodes comprises at least one cycle of nodes.

20. The method of claim 14, further comprising:

identifying all reachable nodes from the remaining nodes by processing the remaining nodes in a descending order of the outdegrees; and including all the reachable nodes into nonrooted groups of connected nodes.

21. The method of claim 20, wherein the nonrooted group of connected nodes is a first nonrooted group of connected nodes, and further comprising:

determining that the first nonrooted group of connected nodes is a subgroup of a second nonrooted group of connected nodes among the nonrooted groups of connected nodes; and treating the first nonrooted group of connected nodes and the second nonrooted group of connected nodes as a single nonrooted group of connected nodes.

22. The method of claim 14, further comprising:

causing the rooted group of connected nodes and the nonrooted group of connected nodes to be displayed in a visual format in a graphical user interface (GUI).

23. The method of claim 14, further comprising:

identifying the first set of reachable nodes from the root node using a breadth-first-search algorithm; and identifying the second set of reachable nodes from the particular remaining node using the breadth-first-search algorithm.

24. The method of claim 14, further comprising:

determining a risk value associated with the network of nodes, wherein the risk value is determined based on how many rooted groups of connected nodes and nonrooted groups of connected nodes are present in the network of nodes, wherein the risk value represents an amount of risk exposed to the network of nodes;

comparing the risk value to a predetermined threshold; and in response to determining that the risk value meets or exceeds the predetermined threshold:

automatically generating a warning signal; and executing one or more remedial measures configured to reduce the amount of risk associated with the network of nodes, wherein the one or more remedial measures comprises reconfiguring the network of nodes so that the risk value is smaller than the predetermined threshold.

25. A non-transitory computer-readable medium comprising program code that is executable by one or more processors for causing the one or more processors to:

receive an input representing a network of nodes, wherein the network of nodes is a directed network of nodes, identify one or more subnetworks in the network of nodes, wherein the one or more subnetworks are not connected to each other;

identify a root node in the one or more subnetworks, wherein the root node is a node that has no incoming links in the one or more subnetworks;

identify a first set of reachable nodes from the root node;

create a rooted group of connected nodes, wherein the rooted group of connected nodes comprises the root node and the first set of reachable nodes from the root node;

determine remaining nodes that are present in the one or more subnetworks and outside of the rooted group of connected nodes;

determine outdegrees of the remaining nodes in parallel, wherein each of the outdegrees is a number of outgoing links from a corresponding one of the remaining nodes;

identify a particular remaining node that is associated with a highest outdegree among the outdegrees of the remaining nodes, wherein the particular remaining node is a non-root node;

identify a second set of reachable nodes from the particular remaining node;

create a nonrooted group of connected nodes, wherein the nonrooted group of connected nodes comprises the particular remaining node and the second set of reachable nodes from that particular remaining node; and generate an output that indicates the rooted group of connected nodes and the nonrooted group of connected nodes.

26. The non-transitory computer-readable medium of claim 25, wherein the input is in a form of a table defining the network of nodes, wherein two or more nodes in the network of nodes represent two or more objects, and wherein at least one link between the two or more nodes represents an interdependency between the two or more objects.

27. The non-transitory computer-readable medium of claim 25, further comprising program code that is executable by the one or more processors for causing the one or more processors to:

identify all root nodes in the one or more subnetworks by processing the one or more subnetworks in parallel; and identify all reachable nodes from all the root nodes in parallel.

28. The non-transitory computer-readable medium of claim 25, further comprising program code that is executable by the one or more processors for causing the one or more processors to:

identify the one or more subnetworks using a union-find algorithm;

identify the first set of reachable nodes from the root node using a breadth-first-search algorithm; and identify the second set of reachable nodes from the particular remaining node using the breadth-first-search algorithm.

29. The non-transitory computer-readable medium of claim 25, wherein the nonrooted group of connected nodes is a first nonrooted group of connected nodes, and further comprising program code that is executable by the one or more processors for causing the one or more processors to:

identify all reachable nodes from the remaining nodes by processing the remaining nodes in a descending order of the outdegrees; and include all the reachable nodes into nonrooted groups of connected nodes;

determine that the first nonrooted group of connected nodes is a subgroup of a second nonrooted group of connected nodes among the nonrooted groups of connected nodes; and treat the first nonrooted group of connected nodes and the second nonrooted group of connected nodes as a single nonrooted group of connected nodes.

30. The non-transitory computer-readable medium of claim 25, further comprising program code that is executable by the one or more processors for causing the one or more processors to:

determine a risk value associated with the network of nodes, wherein the risk value is determined based on how many rooted groups of connected nodes and nonrooted groups of connected nodes are present in the network of nodes, wherein the risk value represents an amount of risk exposed to the network of nodes;

compare the risk value to a predetermined threshold; and in response to determining that the risk value meets or exceeds the predetermined threshold:

automatically generate a warning signal; and execute one or more remedial measures configured to reduce the amount of risk associated with the network of nodes, wherein the one or more remedial measures comprises reconfiguring the network of nodes so that the risk value is smaller than the predetermined threshold.

* * * * *